US010659423B2

(12) United States Patent
Gupta et al.

(10) Patent No.: US 10,659,423 B2
(45) Date of Patent: May 19, 2020

(54) SYSTEM AND METHOD FOR MODIFYING A DOMAIN NAME SYSTEM TEMPLATE

(71) Applicant: Go Daddy Operating Company, LLC, Scottsdale, AZ (US)

(72) Inventors: Nitin Gupta, Mountain View, CA (US); Rahul Mahajan, San Francisco, CA (US); Richard Merdinger, Iowa City, IA (US); John Patrick Roling, Marion, IA (US); Karen Trueblood Munoz, Scottsdale, AZ (US); Steven Louis Wiesenthal, Phoenix, AZ (US)

(73) Assignee: Go Daddy Operating Company, LLC, Scottsdale, AZ (US)

( * ) Notice: Subject to any disclaimer, the term of this patent is extended or adjusted under 35 U.S.C. 154(b) by 497 days.

(21) Appl. No.: 14/577,725

(22) Filed: Dec. 19, 2014

(65) Prior Publication Data
US 2016/0182441 A1 Jun. 23, 2016

(51) Int. Cl.
*G06F 15/16* (2006.01)
*H04L 29/12* (2006.01)

(52) U.S. Cl.
CPC ...... *H04L 61/1511* (2013.01); *H04L 61/3025* (2013.01)

(58) Field of Classification Search
CPC ............. H04L 61/1511; H04L 61/3025; H04L 29/12066; H04L 29/12641
USPC ........................................................ 709/245
See application file for complete search history.

(56) References Cited

U.S. PATENT DOCUMENTS

| | | |
|---|---|---|
| 6,154,738 A | 11/2000 | Call |
| 6,338,082 B1 | 1/2002 | Schneider |
| 6,351,743 B1 | 2/2002 | DeArdo et al. |
| 6,769,031 B1 | 7/2004 | Bero |
| 6,880,007 B1 | 4/2005 | Gardos et al. |
| 6,895,431 B1 | 5/2005 | Bero |
| 6,928,167 B1 | 8/2005 | Maeda et al. |
| 6,986,049 B2 | 1/2006 | Delany |
| 7,069,323 B2 | 6/2006 | Gardos et al. |
| 7,076,541 B1 | 7/2006 | Burstein et al. |

(Continued)

OTHER PUBLICATIONS

RFC 1464, Using the Domain Name System to Store Arbitrary String Attributes, May 1, 1993.

(Continued)

*Primary Examiner* — Tan Doan
(74) *Attorney, Agent, or Firm* — Greenberg Traurig, LLP

(57) ABSTRACT

A system and method for modifying domain name system (DNS) templates are presented. A DNS template database is configured to store DNS templates. A DNS record database is configured to store a plurality of DNS records for a plurality of domain names. A host computer server is configured to receive an electronic signal encoding a request containing a modification to a DNS template from a user, the DNS template being stored in the DNS template database, access the DNS template database to modify the DNS template according to request containing the modification to create a modified DNS template, identify a plurality of domain names using the DNS template, and, for each domain name in the plurality of domain names, access the DNS record database to at least one of modify and create a DNS record for the domain name using the modified DNS template.

17 Claims, 18 Drawing Sheets

(56) References Cited

U.S. PATENT DOCUMENTS

| | | | |
|---|---|---|---|
| 7,167,904 | B1 | 1/2007 | Devarajan et al. |
| 7,472,160 | B2 | 12/2008 | King et al. |
| 7,565,450 | B2 | 7/2009 | Garcia-Luna-Aceves et al. |
| 7,725,602 | B2 | 5/2010 | Lui et al. |
| 7,949,724 | B1 | 5/2011 | Schachter |
| 8,543,732 | B2 | 9/2013 | Ryan |
| 9,137,094 | B1* | 9/2015 | Sayed ............... H04L 61/1511 |
| 9,185,127 | B2* | 11/2015 | Neou ............... H04L 63/1441 |
| 2002/0007413 | A1 | 1/2002 | Garcia-Luna-Aceves et al. |
| 2002/0010795 | A1 | 1/2002 | Brown |
| 2002/0091703 | A1 | 7/2002 | Bayles |
| 2002/0091827 | A1 | 7/2002 | King |
| 2002/0161745 | A1 | 10/2002 | Call |
| 2002/0178383 | A1 | 11/2002 | Hrabik et al. |
| 2004/0064561 | A1 | 4/2004 | Parsons et al. |
| 2004/0078490 | A1 | 4/2004 | Anderson et al. |
| 2004/0083306 | A1 | 4/2004 | Gloe |
| 2004/0083307 | A1 | 4/2004 | Uysal |
| 2004/0102197 | A1 | 5/2004 | Dietz |
| 2004/0162895 | A1 | 8/2004 | Mok et al. |
| 2005/0039017 | A1 | 2/2005 | Delany |
| 2005/0039019 | A1 | 2/2005 | Delany |
| 2005/0063401 | A1 | 3/2005 | Kenner et al. |
| 2005/0144323 | A1* | 6/2005 | Gardos ............ H04L 29/12594 709/245 |
| 2005/0203891 | A1* | 9/2005 | Broadhurst ............ G06Q 30/02 |
| 2005/0273344 | A1 | 12/2005 | Lee et al. |
| 2006/0026114 | A1 | 2/2006 | Gregoire et al. |
| 2006/0101113 | A1 | 5/2006 | Lemson et al. |
| 2006/0112176 | A1 | 5/2006 | Lui et al. |
| 2006/0195609 | A1 | 8/2006 | Han |
| 2006/0230380 | A1* | 10/2006 | Holmes ............... H04L 61/3025 717/117 |
| 2006/0235972 | A1 | 10/2006 | Asnis |
| 2007/0266141 | A1 | 1/2007 | Norton |
| 2007/0094411 | A1 | 4/2007 | Mullane et al. |
| 2007/0124285 | A1 | 5/2007 | Wright et al. |
| 2007/0208699 | A1 | 9/2007 | Uetabira et al. |
| 2007/0214284 | A1 | 9/2007 | King et al. |
| 2008/0005127 | A1 | 1/2008 | Schneider |
| 2008/0065974 | A1 | 3/2008 | Campbell |
| 2008/0168131 | A1 | 7/2008 | Maker et al. |
| 2008/0189263 | A1 | 8/2008 | Nagle |
| 2008/0201487 | A1 | 8/2008 | Blinn et al. |
| 2008/0235383 | A1 | 9/2008 | Schneider |
| 2009/0083413 | A1 | 3/2009 | Levow et al. |
| 2009/0171678 | A1 | 7/2009 | Zimmerman et al. |
| 2009/0171823 | A1 | 7/2009 | Zimmerman et al. |
| 2009/0177549 | A1 | 7/2009 | Ruiz |
| 2010/0037314 | A1 | 2/2010 | Perdisci et al. |
| 2010/0235411 | A1* | 9/2010 | Bray ............... G06F 17/3089 707/812 |
| 2010/0287254 | A1 | 11/2010 | Ruiz |
| 2010/0287484 | A1 | 11/2010 | Ruiz |
| 2013/0151946 | A1* | 6/2013 | Rioux ............... H04L 61/3025 715/234 |
| 2014/0188871 | A1 | 7/2014 | Bushlack et al. |
| 2014/0373097 | A1 | 12/2014 | Thayer et al. |
| 2014/0373127 | A1 | 12/2014 | Thayer et al. |
| 2015/0081440 | A1* | 3/2015 | Blemaster ............ G06F 16/951 705/14.54 |

OTHER PUBLICATIONS

Fusu introduces Domain Stock Exchange in private beta, http://www.domainnamenews.com/domain-sales/fusuintroduces-domain-stock-exchange-in-private-beta/885, Oct. 17, 2007.

Dnxpert, Fusu Domain Stock Exchange in Beta, http://www.dnxpert.com/2007/10/18/fusu-domain-stock-exchange-in-beta/.

Register.com to Issue Baltimore Digital Certificates Making e-Security Accessible to All e-Businesses, Nov. 20, 2008, Register.com, p. 1.

CertaintySolutions; "Understanding DNS: How to Register for, Configure, and Change DNS Service"; Sep. 2000; Certainty Solutions Inc; pp. 1-7.

* cited by examiner

Domain Details

All Domains » 03-05-2010TEST3.CO

PHOTOPROCESSING.COM

Status: Active | Created: 7/10/2010 | Expires: 7/9/2015 | Folder: Multiple | Profile: None Renew | Upgrade | Buy & Sell | Account Change | Delete Settings | DNS Zone File | Contacts

Zone File ⓘ
Last updated 4/3/2014 11:19:04 AM MST

Edit | Templates ∨ | More ∨

Tumblr × ← 654    Microsoft O365 × ← 658    More ▽

18 records in this zone    Filter List ∨

A (Host) ⓘ

| Host | Points To | TTL |
|---|---|---|
| @ | 172.19.67.184 | 600 seconds |

🔲 Tumblr applied ← 652

MX (Mail Exchanger) ⓘ

| Priority | Host | Points To | TTL |
|---|---|---|---|
| 10 | @ | mailstore1.secureserver.net | 1 Hour |

🔲 Office 365 applied ← 656

SYSTEM AND METHOD FOR MODIFYING A DOMAIN NAME SYSTEM TEMPLATE

The present disclosure relates generally to systems and methods relating to domain name system (DNS) templates and, more particularly, to the creation and use of DNS templates, the distribution and retrieval of DNS templates through a marketplace, and the creation of DNS setting restore points.

BACKGROUND OF THE INVENTION

The Internet is a worldwide network of computers and computer networks arranged to allow the easy and robust exchange of information between users of computers. Hundreds of millions of people around the world have access to computers connected to the Internet via Internet Service Providers (ISPs). Content providers place multimedia information, i.e. text, graphics, sounds, and other forms of data, at specific locations on the Internet referred to as websites. The combination of all the websites and their corresponding web pages on the Internet is generally known as the World Wide Web (WWW) or simply web.

Websites may be created using HyperText Markup Language (HTML). The HTML tags define how the web pages for the website are to be displayed. Users of the Internet may access content providers' websites using software known as a Web browser. After the browser has located the desired webpage, the browser requests and receives information from the web server typically in the form of an HTML document, and then displays the webpage content for the user. The user may then view other web pages at the same website or move to an entirely different website using the browser.

In most cases, browsers are able to locate specific websites because the website is hosted by a server computer having a unique Internet Protocol (IP) address. Presently, there are two standards for IP addresses. The older IP address standard, often called IP Version 4 (IPv4), is a 32-bit binary number, which is typically shown in dotted decimal notation, where four 8-bit bytes are separated by a dot from each other, e.g. 64.202.167.32. The notation is used to improve human readability. The newer IP address standard, often called IP Version 6 (IPv6) or Next Generation Internet Protocol (IPng), is a 128-bit binary number. The standard human readable notation for IPv6 addresses presents the address as eight 16-bit hexadecimal words, each separated by a colon, for example 2EDC:BA98:0332:0000:CF8A:000C:2154:7313.

But IP addresses, even in a human readable notation, are difficult to remember and use by people. Uniform Resource Locators (URLs) are strings of text that are easier to remember than IP addresses and may be used to point to any website, directory or file on the Internet. A browser is able to access a website on the Internet through the use of a URL. The URL may include a Hypertext Transfer Protocol (HTTP) request combined with the website's Internet address, also known as the website's domain name. An example of a URL with an HTTP request and domain name is: http://godaddy.com. In this example, the "http" identifies the URL as an HTTP request and the "godaddy.com" is the domain name.

Individuals, companies, and other entities that provide content on the web generally want to use their name or one of their trademarks as part of their domain name. Thus, domain names are generally company trademarks, personal names or short phrases concatenated with a top level domain name (TLD) extension (e.g .com, .net, org, .biz, .us, .cc, .ws, .de, etc.). TLD extensions can be divided into two groups. The first group is known as generic Top-Level Domains (gTLD) and the second group is country code TLDs (ccTLD).

Domain names are much easier to remember and use than their corresponding IP addresses. The Internet Corporation for Assigned Names and Numbers (ICANN) approves some gTLDs and delegates the responsibility to a particular organization (hereinafter registry) for maintaining an authoritative source for the registered domain names within a TLD and their corresponding IP addresses. For certain TLDs, e.g., .biz, .info, .name, and .org, the registry is also the authoritative source for contact information related to the domain name and is referred to as a "thick" registry. For other TLDs, e.g., .com, .net, only the domain name and name server information is stored within the registry, and a registrar is the authoritative source for the contact information related to the domain name. Such registries are referred to as "thin" registries. Most gTLDs are organized through a central domain name Shared Registration System (SRS) based on their TLD.

The process for registering a domain name with .com, .net, .org and some other registries allows a customer to use an ICANN-accredited registrar. For example, if a customer, John Doe, wishes to register the domain name "JohnDoe.com", John Doe may initially determine whether the desired domain name is available by contacting a registrar. The customer may make this contact using the registrar's webpage and typing the desired domain name into a field on the registrar's webpage created for this purpose. Upon receiving the request from the customer, the registrar may ascertain whether "JohnDoe.com" has already been registered by checking the SRS database of the registry associated with the TLD of the domain name. The results of the search may then be displayed on the webpage to thereby notify the customer of the availability of the domain name. If the domain name is available, the customer may proceed with the registration process. Otherwise, the customer may keep selecting alternative domain names until an available domain name is found.

BRIEF DESCRIPTION OF THE DRAWINGS

FIG. 7 is a screenshot showing an example control panel for the DNS records for a domain name in which a number of records are locked.

DETAILED DESCRIPTION

Figure 1:
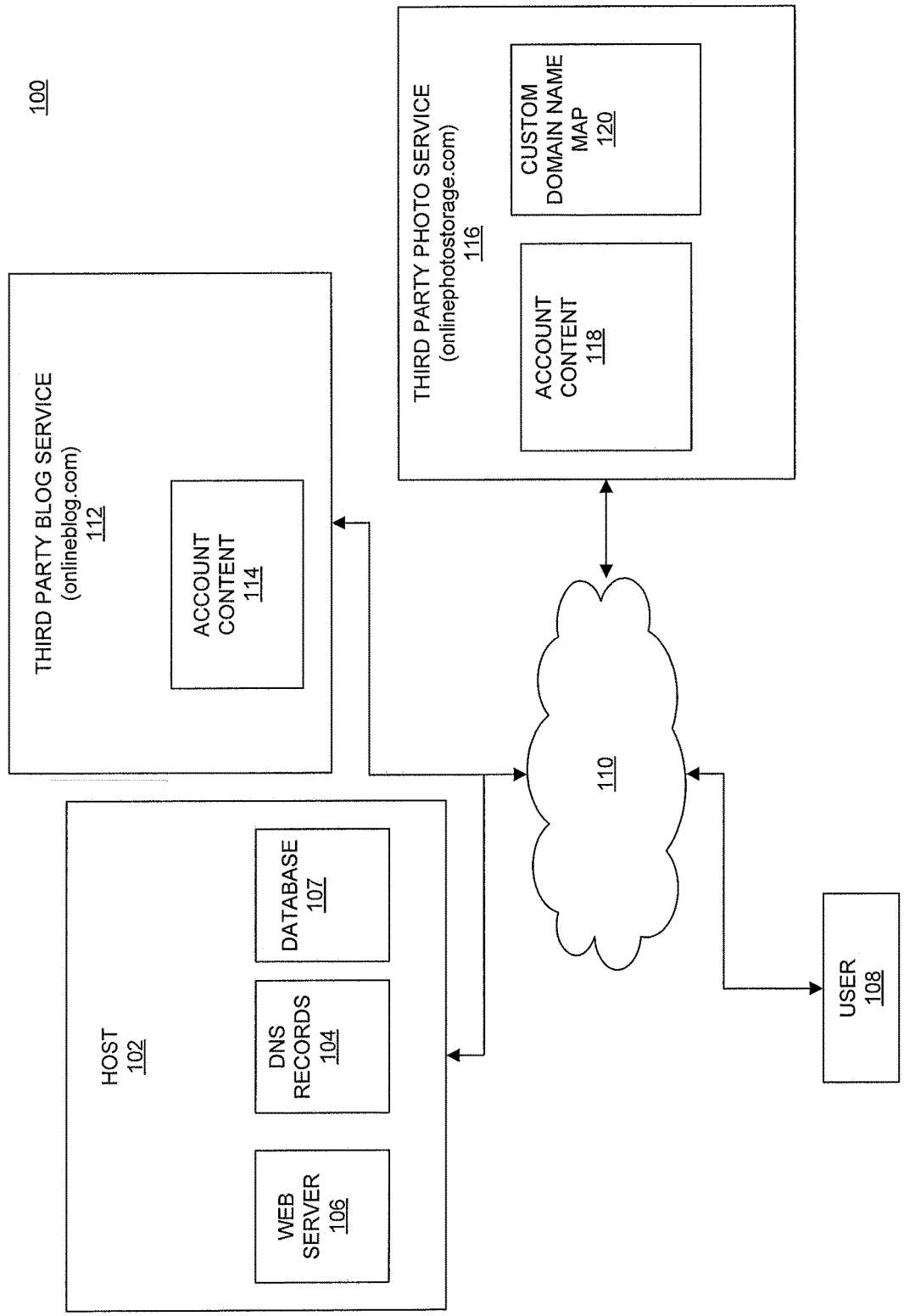
FIG. 1 is a block diagram showing an environment in which a custom domain name may be implemented.

The present disclosure relates generally to systems and methods relating to domain name system (DNS) templates and, more particularly, to the creation and use of DNS templates, the distribution and retrieval of DNS templates through a marketplace, and the creation of DNS setting restore points.

Once registered, a number of DNS settings are established for a domain name. The DNS settings can set forth IP addresses for the domain name, as well as for a number of sub-domain names of the primary domain name. The DNS settings can also set forth a listing of name servers to be associated with the domain name, mail exchange (MX) records, and aliases between domain names (e.g., CNAME records).

After the DNS settings have been specified for a domain name, the settings must propagate out to a number of servers making up the DNS. This can take some time, so there may be a delay between the current DNS settings for a particular domain name and the settings that are actually in effect for the domain name for any particular Internet user.

The delay in propagating DNS settings as well as the complexity of the settings themselves, can make configuring DNS for a domain name quite difficult and high risk. Often times, to make their domain name work with other services, users must create a number of complex DNS setting entries for their domain name. Any error in those entries can cause one or more services associated with the domain name (e.g., a website or Internet-based services) to operate incorrectly. In the case of a busy website, for example, this could result in a significant service disruption and possibly significant loss of business. This is particularly true when considering the propagation delays associated with DNS settings. Any error or mistake in the DNS settings could take over 48 hours to correct—24 hours to propagate the incorrect settings and an additional 24 hours to propagate the correct DNS settings.

In many cases, a domain name can be used to reference a number of different services via the Internet or other network. This allows a single domain name (or collection of sub-domains) to provide shortcuts or simple references to a number of different online services that may otherwise be accessed using entirely different domain names. A single user, for example, having registered the domain name 'example.com' could use that single domain to receive email for the domain name 'example.com' even if their email service hosts email for multiple domains. Similarly, the user may point their domain name (or sub-domains) to other online services, such as a blog service, a photo sharing service, or an online banking service.

This arrangement both reduces the number of domains that must be remembered and recalled by the user and also enables the user's domain name to operate as a vanity or custom domain name. It allows the domain name to be used to reference services hosted by many different companies for many different purposes. For example, a user can use a custom domain name associated with their company to access (and allow customers to access) content on third party services. If the business has a primary website (e.g., at 'www.company.com'), but uses third party services to provide some of the content on the website, such as a blog, a custom domain name (e.g., 'blog.company.com') may be utilized so that when a visitor accesses the company's blog content, they do so using the custom domain name, rather than the domain name of the entity hosting the blogging software.

This provides consistent branding by ensuring that the company's domain name is used through the company's website, even when customers are, in fact, interacting with those third party services.

A first technique for implementing custom domain names for online services involves creating DNS records that point the custom domain name directly to the desired third party service. This may involve creating an A record for the custom domain name that points directly to an IP address of the third party service or a CNAME record that points the custom domain name to the domain name of the third party service. The table below illustrates an example of an A record and a CNAME record for implementing a custom domain via DNS entries.

TABLE 1

| Name | Type | Value |
| --- | --- | --- |
| photos.example.com | A | 192.168.0.1 |
| blog.example.com | CNAME | custom.free-blog.com |

In the example DNS entries depicted in Table 1, two custom domain name entries have been created. The first links the custom domain name 'photos.example.com' directly to an IP address—in this example, this would be the IP address of a third party photo sharing site. The second entry links the custom domain name 'blog.example.com' directly to the domain 'custom.free-blog.com', which provides a blogging service. When a visitor visits one of the custom domain names, these DNS records ensure that the visitor's web traffic is directed to the correct third party service. In the case of configuring email services, a number of DNS records may be created that control how emails are routed to an email service provider. In configuring email, example DNS records may include, for example, MX records, which identify the host name of the email service host, as well as particular TXT records configured to enhance the security of email services.

A second mechanism for implementing custom domain names includes the use of 301 and 302 URL redirects. URL redirection involves configuring a web server hosting a domain name to automatically redirect a request that is issued to the custom domain name to a predetermined URL. Generally, URL redirection can be of two varieties, 301 redirects or 302 redirects. A 301 redirect indicates that the redirection is permanent and causes the user's browser, or other software receiving the redirection instruction, to permanently update its own records to indicate that the custom domain name will always point to the target URL identified by the 301 redirect message. Conversely a 302 redirect provides the same functionality, but indicates that the redirection is only temporary. As such, the browser or other software would not permanently update its records in response to a 302 redirect message received from a web server.

FIG. 1 is a block diagram showing environment 100 in which a custom domain name may be implemented. Environment 100 includes a host 102. Host 102 may include a registrar providing services enabling users to register domain names, as well as a number of other services. For example, Host 102 also stores a plurality of DNS records 104 and operates as a DNS server or host. Host 102 may also provide web hosting services and, as such, includes web server 106.

User 108 communicates with host 102 via communications network 110 (e.g., the Internet). In general, user 108 communicates with host 102 using a computer and suitably configured software, such as a web browser. User 108 may communicate with host 102 to access the domain name registry services provided by the host 102. Using those services, user 108 can search for and register a desired domain name. Once registered, user 108 can configure DNS settings for the domain name by changing one or more records within DNS records 104. User 108 may also elect to setup a web page to be hosted at the domain name by web server 106 for the domain name.

User 108 may also communicate with one or more third party service providers via network 110. In the example depicted in FIG. 1, third party blog service 112 allows user 108 to create an account and host blog content with the third party blog service 112. In this example, third party blog service 112 hosts its content at the domain name 'onlineblog.com'. Blog service 112 may allow the user 108 to create and post new content to a blog, or edit content that has already been created. Once submitted, the content is stored in account content 114 data store (e.g., a database) and can be accessed by visitors to the blog via a suitable URL. In the present example, the blog account content 114 of user 108 stored on the third party blog service 112 is accessed via the URL http://onlineblog.com/users/accounts/user123.

Third party photo service 116 allows user 108 to create an account and store photos, images, or other multimedia with the third party photo service 116. In this example, third party photo service 116 hosts its content at the domain name 'onlinephotostorage.com'. Third party photo service 116 enables the user to upload and edit photographs and other media for redistribution via network 110. Once uploaded, images are stored within account content 118. The uploaded images can then be accessed over the network 110 using a suitable URL. In the present example, the photo content of the user 108 can be accessed via the URL http://onlinephotostorage.com/users/accounts/example/user123.

In this example, user 108 would like to access account content 114 (containing blog entries) and account content 118 (containing photo content) using sub-domains of the domain name 'mydomain.com', which has been previously registered with host 102. To do so, user 108 must configure one of the techniques described above (e.g., creating new DNS records or URL redirection) for implementing a custom domain name. This may not be a simple process as different third party services may only allow the use of one technique or another.

In this example, third party blog service 112 only allows the use of URL redirects when implementing a custom domain name. As such, user 108 must utilize either a 301 or a 302 redirect to point the custom domain name 'blog.mydomain.com' to third party blog service 112.

This first requires that user 108 create an entry in DNS records 104 so that the domain 'blog.mydomain.com' points to a web server under the control of user 108. In this example, user 108 is able to modify the configuration of web server 106 provided by host 102. Accordingly, an entry is created in DNS records 104 pointing 'blog.mydomain.com' to web server 106.

User 108 then configures web server 106 so that, in response to a request for the domain name 'blog.mydomain.com', web server 106 returns a 301 (or, alternatively, 302) redirect message pointing to the URL 'http://onlineblog.com/users/accounts/exampleuser', which contains account content 114.

With both DNS records 104 updated and the 301 redirect created, the custom domain name can be used as follows.

In a first step, user 108 (or any other visitor wishing to view the blog of user 108) enters the custom domain name 'blog.mydomain.com' into a browser. The browser will then retrieve the DNS records associated with the domain name 'mydomain.com' to identify the host for the domain name 'blog.mydomain.com.' In this example, those records point to web server 106.

Having retrieved the DNS records, the browser will then transmit an HTTP GET request to web server 106 in an attempt to retrieve content associated with the domain name 'blog.mydomain.com.' Web server 106 receives the request, which identifies the domain name 'blog.mydomain.com', and returns the content associated with that domain name to the user's browser. In this case, that content includes the 301 redirect instruction. An example of such an instruction is presented below:

HTTP/1.1 301 Moved Permanently
Location: http://onlineblog.com/users/accounts/exampleuser Having received the 301 redirect message, the browser of user 108 will communicate with third party blog service 112 to retrieve account content 114 stored at the URL 'http://onlineblog.com/users/accounts/exampleuser.'

This, therefore, enables user 108 or any other visitor to simply enter the custom domain 'blog.mydomain.com' into a web browser to access and receive content from third party blog service 112.

In contrast to the blog service 112, third party photo service 116 allows for the use of DNS records to implement custom domains. In this example, user 108 would like to use the custom domain 'photos.mydomain.com' to access account content 118 stored with third party photo service 116.

This first step requires that user 108 create an entry in DNS records 104 that points the custom domain 'photos- .mydomain.com' to the third party photo service 116. This may involve, for example, the creation of an A record that points to the IP address of the photo service 116 or the creation of a CNAME record that points to a domain name of the photo service 116. With the necessary entry in place in DNS records 104, network traffic directed to the domain name 'photos.mydomain.com' will automatically be routed to photo service 116.

Accordingly, if user 108 enters the domain name 'photos.mydomain.com' into a browser, the browser will retrieve the DNS entry corresponding to the domain and transmit an HTTP GET request to the photo service 116. The GET request includes a 'Host:' line that contains the domain name 'photos.mydomain.com.' At this point, however, the photo service 116 would ordinarily respond to the GET request by transmit a default web page in response (i.e., a web page that does not contain account content 118 of user 108). Accordingly, user 108 must also configure photo service 116 in order to associate the domain name 'photos.mydomain.com' with account content 118 of user 108.

To do this, user 108 accesses a user account control panel to inform the photo service 116 that the custom domain name 'photos.mydomain.com' should be associated with the user account of user 108. Photo service 116 then stores that association in custom domain name map 120. In this example, because the account content 118 of user 108 is stored at the URL 'http://onlinephotostorage.com/users/accounts/example/user', the custom domain name map 120 may include a table, such as Table 2 shown below, to store the mapping of custom domain name to user account.

TABLE 2

| Custom Domain Name | User Account Name | Account Content URL |
| --- | --- | --- |
| photos.mydomain.com | user123 | http://onlinephotostorage.com/users/accounts/example/user |

With this mapping in place, when photo service 116 receives the GET request, photo service 116 can analyze the GET request to identify the custom domain name contained in the request's 'Host:' line. Once the custom domain name is identified (i.e., 'photos.mydomain.com'), photo service 116 can consult the records stored in custom domain name map 120 to map the custom domain name to a particular user account. The account content 118 associated with that user account can then be retrieved and transmitted back in response to the request.

It is important to note that using the custom domain name approaches described above, not only can user 108 utilize the custom domain names to access the account content with both blog service 112 and photo service 116, but anybody with access to DNS records 104 and both blog service 112 and photo service 116 can also use the custom domain names to access content.

The present system and method provides a domain name control panel that enables a user to automatically configure a number of custom domain names to point to a number of third party services. The custom domain names can be setup and configured automatically so that when a user indicates that a particular custom domain name should be linked to a particular third party service, the link can be created with a minimal amount of input from the user and/or work on the user's behalf. Accordingly, the present system can be configured to automatically create DNS entries, 301 or 302 URL redirects, and custom domain name maps with third party services to create the desired custom domain name link.

Figure 2:
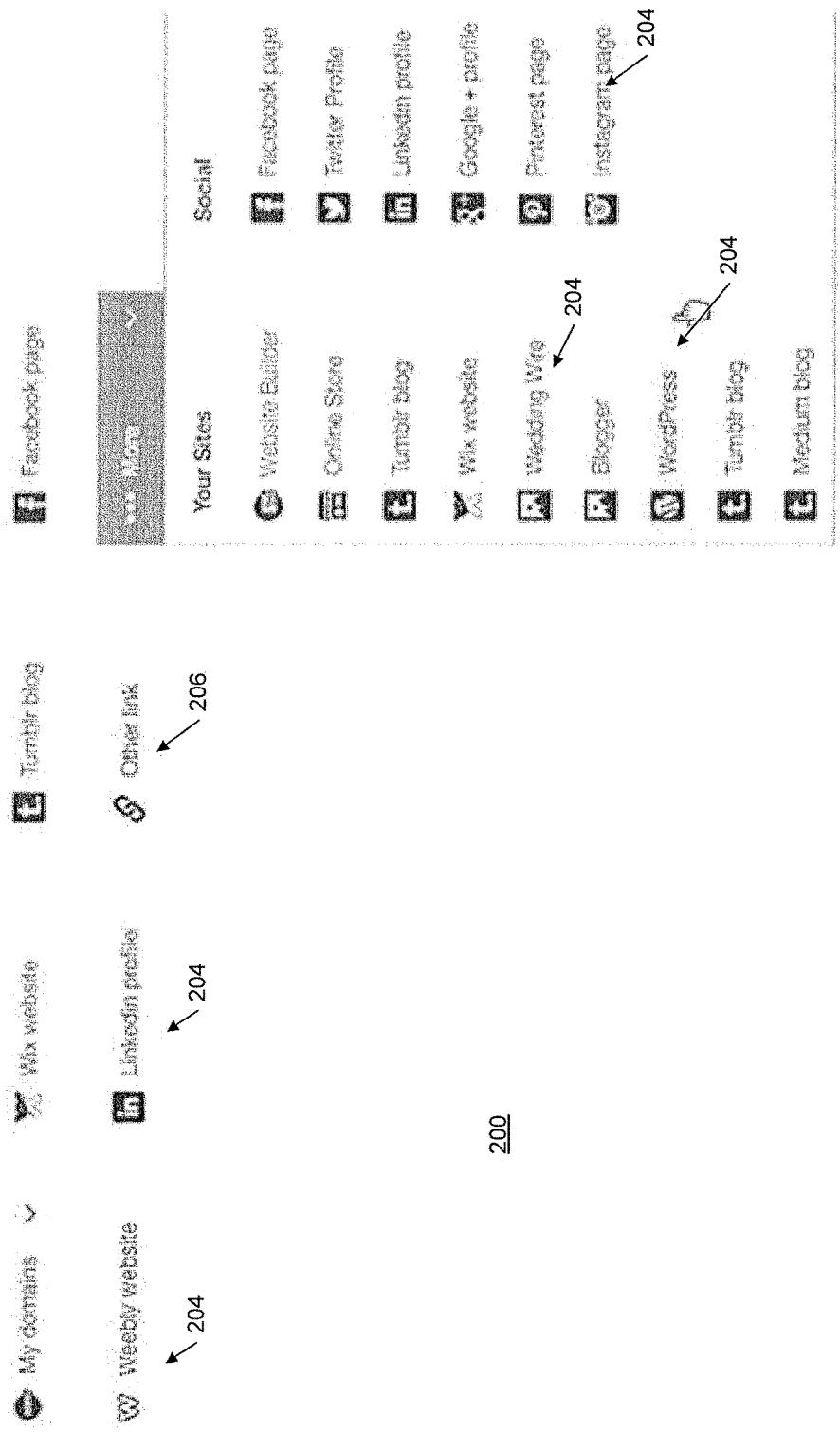
FIG. 2 is a screenshot showing an example user interface enabling a user to create a number of custom domain name links to third party services in accordance with the present disclosure.

FIG. 2 is a screenshot showing an example user interface 200 enabling a user to create a number of custom domain name links to third party services in accordance with the present disclosure. The example presented by user interface 200 allows a user to create a number of custom domain name links for the domain name 'photoprocessing.com'.

To access user interface 200 a user provides authentication credentials (e.g., user name and password) to a registrar with whom the user has registered one or more domain names. After authenticating, the user can access a control panel to control one or more settings associated with those registered domain names. In this example, the user has selected the domain name 'photoprocessing.com' and indicated that the user wishes to create custom domain names linking to third party services.

User interface 200 identifies the domain name 202 currently selected and for which custom domain name links can be created. User interface 200 also provides a number of buttons 204 that can be selected by the user to initiate the process of creating a third party custom domain link. Each button 204 is associated with a different third party service and provides a simple mechanism by which the user can point a custom domain name (e.g., a sub-domain of the domain name 'photoprocessing.com' or the domain 'photoprocessing.com' itself) to the third party service.

Depending upon the implementation, buttons 204 may include clickable text or logos that are associated with the third party service. In some cases, however, buttons 204 may include screen shots showing an example web page from the third party service. In this manner, even if the user is unaware of the name of a particular third party service, the user may recognize the screen shot and elect to create a custom domain name link thereto.

In some implementations, the registrar will have access to information associated with the user that allows for a more intelligent selection and depiction of the various buttons 204 enabling links to third parties. For example, the user's account information stored by the registrar may indicate where the user is located. In that case, the buttons 204 can be arranged so that third party services that are prominent nearby the user can be displayed in a more prominent position, while third party services that are less prominent can be demoted within user interface 200.

In another example, the user's account information may identify a business or entity type or category for the user. For example, the user's account may be affiliated with a business. In that case, the user's account may indicate the type of business (e.g., bakery, bike shop, law firm, and the like). With the business type identified, the buttons 204 can be arranged so that third party services that are more relevant to the business type are display in a prominent position, while less relevant third party services are demoted.

For example, if the user is affiliated with a bakery or restaurant, the button 204 that allows the user to create a custom domain name for a YELP account may be made more prominent. Conversely, if the user is affiliated with a photography service, a button 204 enabling the user to link to a photo sharing site (e.g., FLICKR) may be made more prominent. Similarly, if the user is unaffiliated with a business, buttons 204 associated with third party services that are more relevant to personal web sites may be given more prominence (e.g., PINTEREST and WEDDING WIRE).

In other embodiments, buttons 204 may be prioritized to make some buttons 204 more prominent based upon other factors or variables, such as the prior purchases or product usage history of the user or the user's prior use of some third party services. In some cases, third parties may compensate host 102 for displaying some buttons 204 in more prominent positions that others.

In this disclosure, a more prominent placement location for a button 204 may comprise any location in the listing of buttons 204 depicted within user interface 200 that may be more likely to attract the attention of a user using user interface 200 than another location. The prominent placement location, as non-limiting examples, may be determined by human factors, usability, or similar studies, or may be a simple arbitrary or intuitive choice. As illustrated by user interface 200, it also may comprise a preferred placement of a button 204 within a vertical arrangement of a plurality of buttons 204, perhaps at the top of a list of buttons 204, or simply a higher placement within such a list than the placement of other buttons 204. The preferred placement may therefore, as non-limiting examples, comprise a topmost, bottom-most, or more centered position in any such vertical list.

In some embodiments, user interface 200 may include one or more buttons 204 or other user interface mechanisms enabling the user to create custom domain name links between domain names that are registered to the user. For example, if the user has registered the domain names companyname.com and companyname.co, one or more buttons 204 may be included in user interface 200 enabling the user to forward the .co domain name to the .com domain name (assuming that the .com domain name is already tied to accessible user content) so that Internet traffic that is initially directed to the .co domain name is automatically routed to the .com domain name instead. Additionally, one or more buttons 204 may be made available allowing the user to point companyname.blog to a specific URL, such as companyname.com/blog, if content is detected at that URL.

To enable the operation of user interface 200, host 102 stores, for each third party service that may be linked to (e.g., for each button 204), information describing how such link is to be created in a third party service link database. This may involve, for each third party service provider, storing data indicating whether the third party service allows DNS-based custom domain names, or relies on 301 or 302 redirects. The data will further include, for each technique of creating a custom domain name link, the specific details of how such a custom domain name link is to be created. For example, the data may include a listing of DNS records that must be created to enable the custom domain name link to operate. The data may also include a listing or description of user-specific data that must be retrieved from the third party service provider and inserted into a DNS record before the custom domain name link will function correctly.

For services that support DNS-based custom domain names, host 102 may store the following information depicted in Table 3 in the third party service link database.

TABLE 3

| Data | Description |
| --- | --- |
| Name | The name of the third party service |
| Mobile? | Indicates whether the third party service is hosting website content formatted for display on a mobile device - yes/no value. |
| DNS templates (type and value) | Defines a number of templates for DNS records that must be created to implement the custom domain name link. The DNS record templates may be static entries that specify a name, type (e.g., A or CNAME) and value (e.g., a known IP address or domain name). |

TABLE 3-continued

| Data | Description |
| --- | --- |
| | The templates may include variables that must be replaced by user-specific tokens. |
| Region | Indicates a geographical region for the third party service |
| Authentication Mechanism | Specifies an authentication mechanism that the host 100 can use to access the third party service to create and modify custom domain name map records stored with the third party service as well as retrieve user-specific tokens from the third party service(e.g., OAuth) |
| Default? | Indicates whether this entry is the default entry for the third party service |

For services that support 301 or 302 URL redirects for custom domain names, host 102 may store the following information depicted in Table 4 in the third party service link database.

TABLE 4

| Data | Description |
| --- | --- |
| Name | The name of the third party service |
| Mobile? | Indicates whether the third party service is hosting website content formatted for display on a mobile device - yes/no value. |
| URL Redirect template | Stores a template for the URL that will be entered into the URL redirect - may include variables that are filled in at the time of creation with information provided by the user (e.g., https://www.service.com/users/accounts/home/[account name]) |
| Token(s) | Identifies each of the tokens we need from the user in order to be able to create the URL redirect (e.g., account name, account nickname, account number, etc.) |
| 301 or 302 URL redirect? | Indicates whether the redirect should be implemented as a 301 or 302 redirect |
| Region | Indicates a geographical region for the third party service |
| Default? | Indicates whether this entry is the default entry for the third party service |

For services that provide email services, host 102 may additionally store MX records and sender policy framework (SPF) details for the service in the third party service link database.

The third party service link database (e.g., the records described above and in Table 3 and Table 4) may be stored by host 102 in any suitable storage location and format. For example, the records may be stored in a database, such as a relational database (e.g., PostgreSQL, ORACLE database, MICROSOFT SQL SERVER) configured to store the third party service link database accessible to host 102. The database may be local to (e.g., running on) host 102, or may be hosted by a server computer remote to host 102 and accessible using network 110. The third party service link database may be stored, for example, in one or more tables of a relational database (e.g., database 107 of FIG. 1). Alternatively, the records may be stored in tables or text files on any suitable data storage device accessible to host 102. In various embodiments, the records may store additional information such as an "Activation Rate" which indicates how many users are setting up that type of custom domain name. The records may also store a cost value, should a monetary fee or cost be associated with a particular type of custom domain name.

Returning to FIG. 2, to create a custom domain name for a third party service, the user first selects one of buttons 204 on user interface 200 provided by host 102. After the user selects one of buttons 204, indicating that the user wishes to create a custom domain name for the third party service associated with that button 204, host 102 identifies the third party service associated with the button 204 selected by the user.

Figure 3:
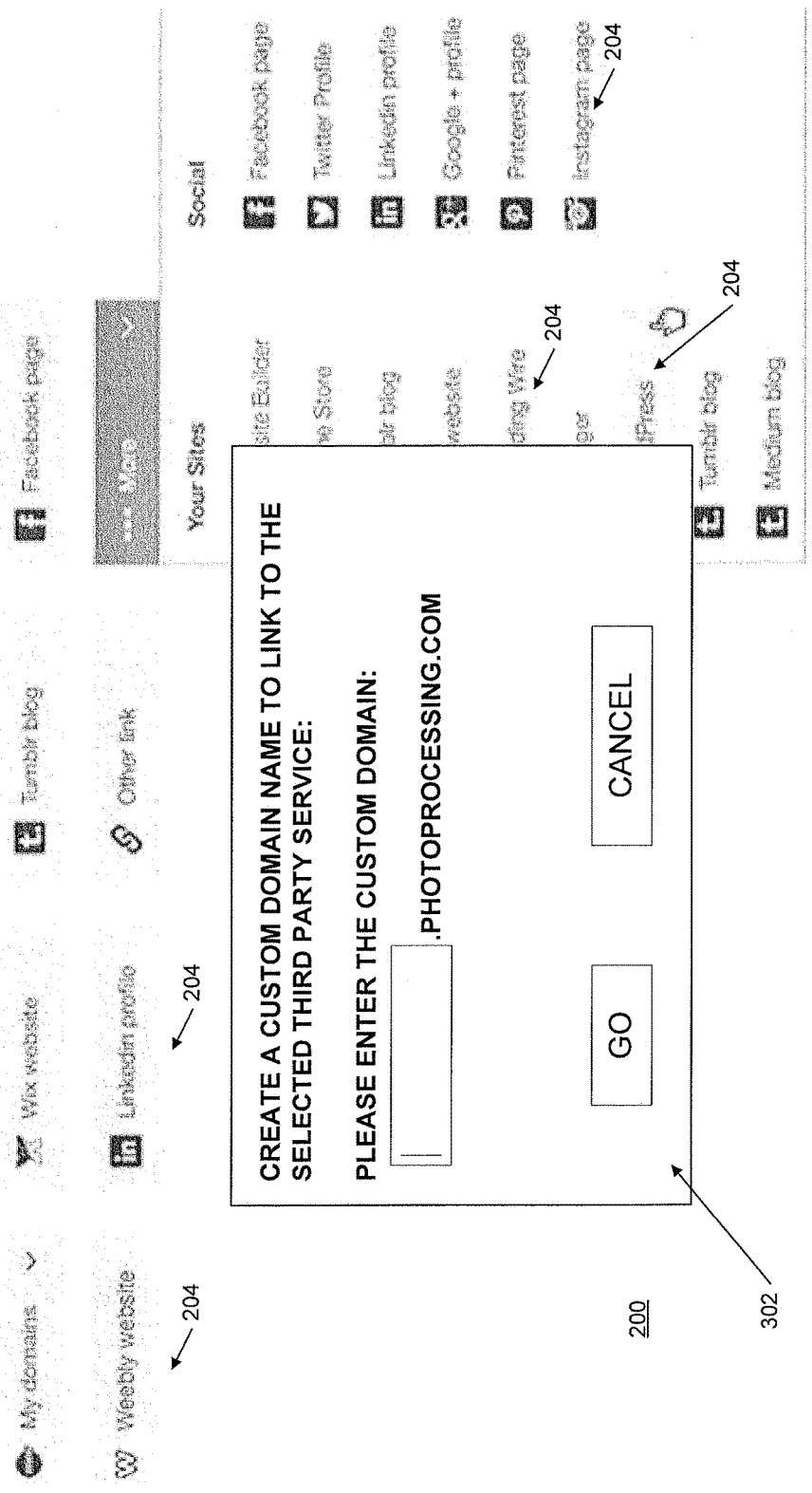
FIG. 3 is a screen shot of the user interface of FIG. 2 after the user has selected a button to create a custom domain name for a third party service.

With the third party service selected and identified, host 102 then prompts the user to enter a custom domain name to be linked to the selected third party service. The custom domain name, for example, may be a sub-domain of the domain name for which settings are currently being modified (e.g., photoprocessing.com in FIG. 2) or the domain name itself. Accordingly, the custom domain name may be a second level domain name (SLD), n-level domain (nLD), or any other form of domain name. FIG. 3, for example, shows a screen shot of user interface 200 after the user has selected one of buttons 204 to create a custom domain name for a third party service. As illustrated, the user is prompt with form 302 to supply the desired custom domain name to be linked to the selected third party service. Although the example depicted in FIG. 3 shows the user being able to enter a sub-domain to the domain name 'photoprocessing.com' as the custom domain name, the user may instead elect to not enter a sub-domain and use the domain name 'photoprocessing.com' for the custom domain name.

After the user enters the custom domain name (in this example, 'blog.photoprocessing.com'), the host 102 looks up the selected third party service in the third party service link database to determine whether the selected third party service allows DNS-based custom domain names. If the selected third party service allows DNS-based custom domain names, the host 102 may perform the method illustrated in FIG. 4 to create the user's desired custom domain name.

Figure 4:
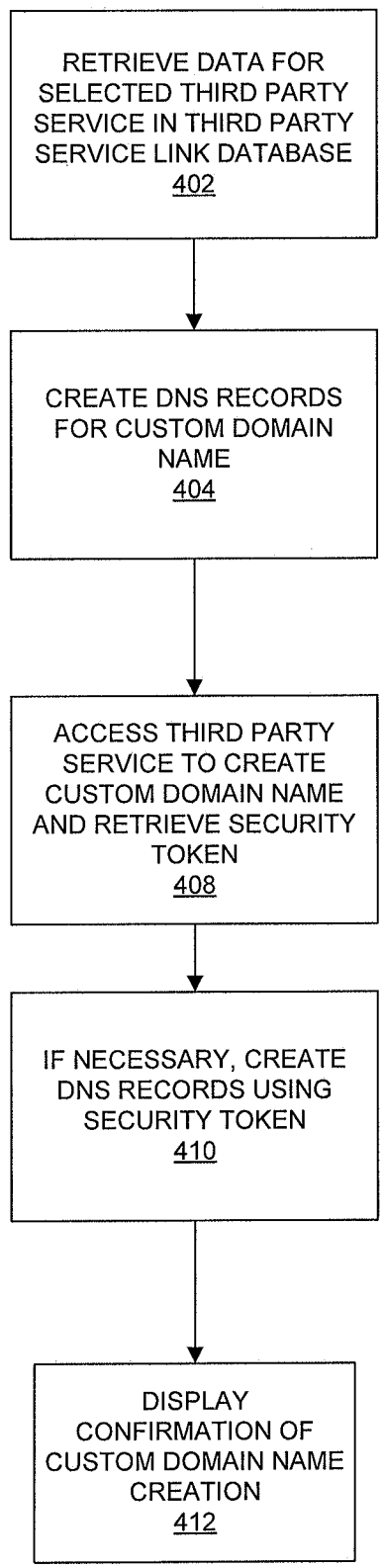
FIG. 4 is a flowchart depicting a method for creating a DNS-based custom domain name for a third party service.

Referring to FIG. 4, in step 402 host 102 accesses the third party service link database to retrieve the entry for the selected third party service. In some cases, where there are multiple entries for the selected third party service, this will involve selecting the entry that is associated with a location that matches that of the user. In this optional step, the location of the user may be identified, for example, by examining the customer records of the user (e.g., to identify a mailing address or residence address for the user), or analyzing an IP address of the user to determine a location of the user's computer. Then, the entry for the selected third party service with a region that encompasses that of the user can be retrieved. In the event that no entry includes a region that encompasses the user, one of the entries for the selected third party service may be defined as a default entry to be utilized.

In some cases, the custom domain name provided by the user will at least partially determine which entry is retrieved for the selected third party service. For example, if the custom domain name entered by the user is 'mobile.photoprocessing.com' or 'm.photoprocessing.com', the use of the terms 'mobile' or 'm' may indicate that the user wishes to use the custom domain name to display content suited for display on a mobile device. In that case, host 102 would retrieve the entry for the third party service that is designated as being mobile, should one exist. The host 102 may make this selection automatically, or may prompt the user to confirm that the custom domain name is for mobile content.

Once the entry is retrieved for the selected third party service, in step 404 host 102 analyzes the DNS templates stored in the entry. As described above in reference to Table 3, the DNS templates may include static entries as well as entries that contain variables. The static templates will generally set forth a type as well as a value for the template. Example static entries may have a type of 'A' and a value including an IP address (e.g., '123.123.123.123'), for example. Similarly, a static entry may have a type of 'CNAME' and a value of a domain name (e.g., 'domains.blogtool.com.').

For the records that are static, host 102 creates a DNS record (e.g., within DNS records 104) for each static record using the data from the entry and the user's desired custom domain name. If the template includes an IP address for the selected third party service, host 102 may create an A record within DNS records 104 that points the custom domain name to the IP address. Alternatively, if the template includes a domain name for the third party service, host 102 may create a CNAME record within DNS records 104 that points the custom domain name to the domain name for the third party service. In some embodiments, step 404 may involve host 102 modifying one or more customer records of the user so that DNS records 104 become the controlling DNS records for the user's domain name.

In some cases, however, the DNS templates may include entries that contain variables. This may be the case, for example, if the third party service requires an individual attempting to utilize a custom domain name with the third party service to enter a specific token or code into a DNS record as a means of authenticating that the user has the authorization to create the custom domain name link. These tokens may be strings of characters that must be entered into the DNS record or may include some information known to the user, such as their userid with the third party service. Before the variable templates can be instantiated as DNS records, the variables must be replaced by the suitable token for the user. For example, a variable record in a DNS template may specify a type of 'TEXT' and a value of "photoblog-{token}", where {token} denotes a variable that must be replaced by some security token. For example, the security token for a particular user may be 'XYZ567'. In that case, the variable template would be used in combination with the security token to create a DNS record of type TEXT and having a value of 'photoblog-XYZ567.

If the DNS templates include variables, corresponding DNS records cannot be generated in step 404 because the security tokens are unknown. As such, only DNS records for the static templates will be created in step 404.

In step 408, host 102 accesses the third party service to both setup the custom domain name mapping to the user's account and also, if any of the DNS templates for the third party service include variables, request the necessary security tokens. As mentioned above, the security tokens may include strings of characters or other information such as the user's account name or ID with the third party service.

Host 102 may use any suitable mechanism to access the third party service to both create custom domain name mappings as well as to retrieve security tokens. In one embodiment, host 102 relies upon access mechanisms that are delegated to the host 102 from the third party service, such as OAuth. Alternatively, host 102 may prompt the user for the user's security credentials (e.g., username and password) for the third party service. After the user provides the security credentials, host 102 can use those credentials to access the third party service to setup the custom domain name mapping to the user's account with the third party service in step 410. The third party service may also offer an application program interface (API) through which host 102 can create or modify a custom domain name map after supplying the appropriate security credentials and retrieve security tokens.

If the authentication process described herein should fail, the present system may be configured to display helpful 'next steps' to assist the user in completing the activity manually. These next steps may be stored in the custom domain name link database described above, as the manual 'next steps' may be different for each third party service.

In some other embodiments, however, rather than host 102 prompting the user for authentication credentials and then communicating directly with the third party service provider, step 408 includes host 102 simply providing the user with instructions on how to create the custom domain name mapping with the third party service manually.

In step 410, if any of the DNS templates for the third party service included variables, those variables can be replaced by the security token retrieved in step 408 and the corresponding DNS records can be created.

Once the custom domain name mapping has been created at the third party service to link the custom domain name with the user's account and the DNS records have been created, in step 412 the user can be notified that the custom domain name has been correctly setup for the third party service.

Figure 5:
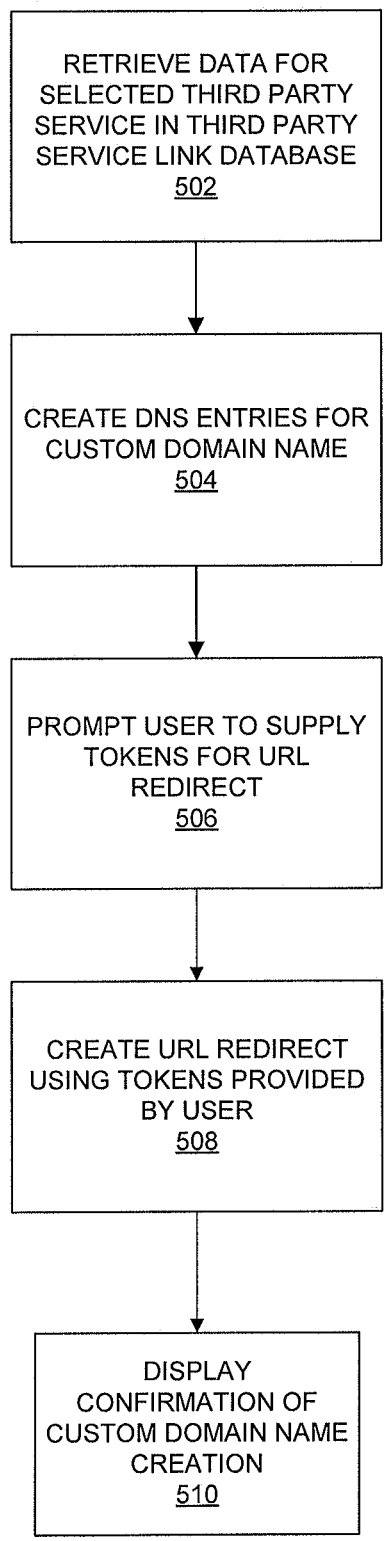
FIG. 5 is a flowchart depicting a method for creating a URL redirect-based custom domain name for a third party service.

If, however, the selected third party service requires URL redirects to implement custom domain names, host 102 may perform the method illustrated in FIG. 5 to create the user's desired custom domain name link.

In step 502, host 102 accesses the third party service link database to retrieve the entry for the selected third party service. In some cases, where there are multiple entries for the selected third party service, this will involve selecting the entry that is associated with a location that matches that of the user. In this optional step, the location of the user may be identified, for example, by examining the customer records of the user, or analyzing an IP address of the user to determine a location of the user's computer. Then, the entry for the selected third party service with a region that encompasses that of the user can be retrieved. In the event that no entry includes a region that encompasses the user, one of the entries for the selected third party service may be defined as a default entry to be utilized.

In some cases, the custom domain name provided by the user will at least partially determine which entry is retrieved for the selected third party service. For example, if the custom domain name entered by the user is 'mobile.photoprocessing.com' or 'm.photoprocessing.com', the use of the terms 'mobile' or 'm' may indicate that the user wishes to use the custom domain name to display content suited for display on a mobile device. In that case, host 102 would retrieve the entry for the third party service that is designated as being mobile, should one exist. Host 102 may make this selection automatically, or may prompt the user to confirm that the custom domain name is for mobile content.

Once the entry is retrieved for the selected mobile service, in step 504 host 102 creates a DNS record (e.g., within DNS records 104). In this case, the DNS entry will point the custom domain name supplied by the user to a web server under the control of host 102 (e.g., web server 106).

Figure 6:
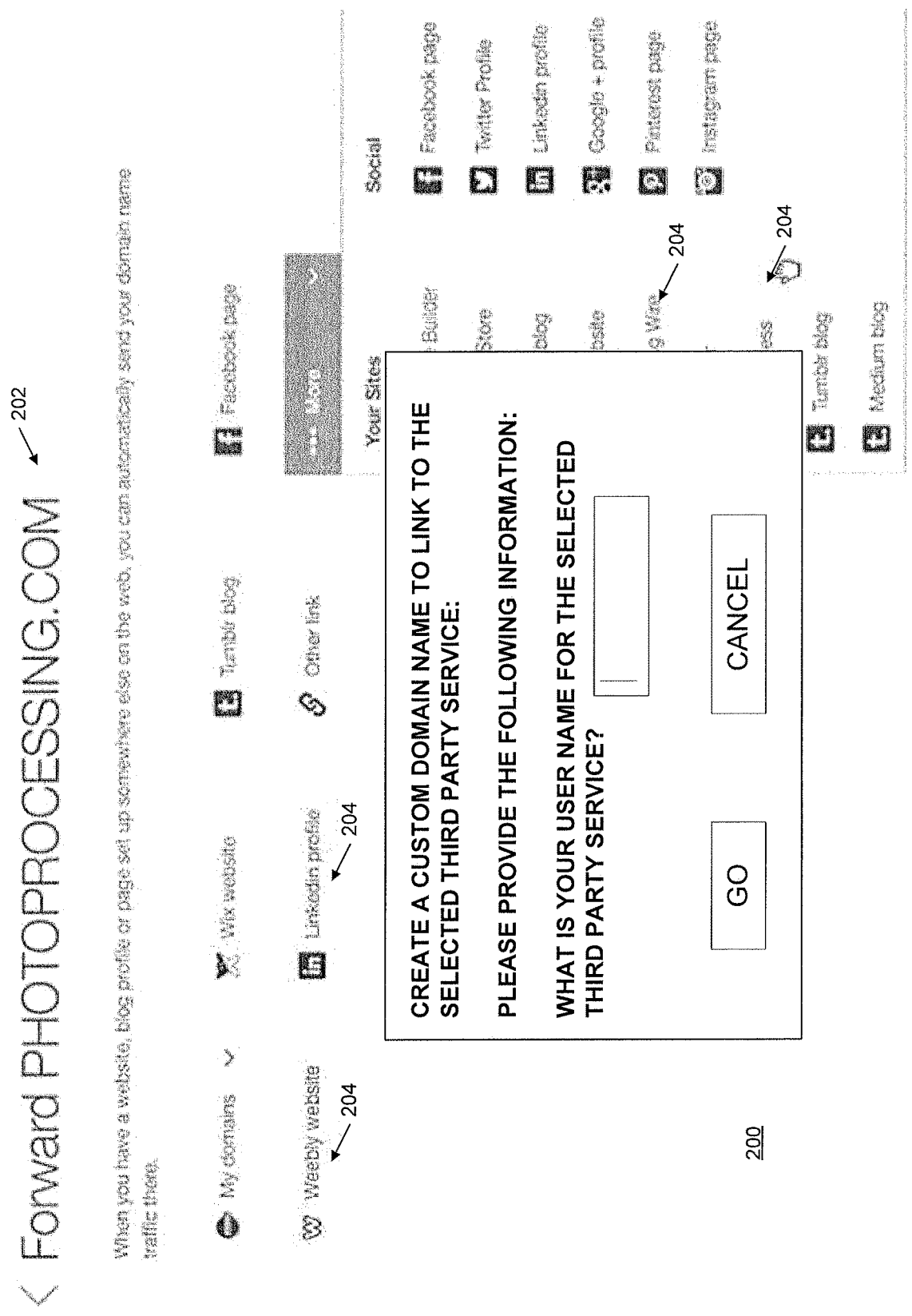
FIG. 6 is a screenshot showing an example user interface for prompting the user to supply the necessary tokens to create a URL redirect-based custom domain name.

With the DNS record created, in step 506 host 102 prompts the user to provide the one or more tokens necessary for the creation of the URL redirect. In many cases, this will be a single token that includes a user name or other user account identifier. FIG. 6 is a screenshot showing an example user interface for prompting the user to supply the necessary tokens to create a URL redirect.

Returning to FIG. 5, after the user has supplied the required tokens, in step 508 host 102 constructs a URL redirect using the supplied tokens and the Redirect URL Template retrieved from the third party service link database. This involves replacing the variables in the template with the tokens that were provided by the user. In an example, a URL redirect is being created for a third party service that has the URL Redirect Template of 'https://www.service.com/users/accounts/home/[account name]'. The user has provided an account name of 'photos_123'. In that case, the account name would be inserted into the URL Redirect Template so that the URL redirect becomes 'https://www.service.com/users/accounts/home/photos_123'.

Host 102 can then create the URL redirect and install the URL redirect on web server 106. This may involve, for example, modifying one or more configuration files (e.g., .htaccess files) within web server 106 or using another configuration mechanism to setup and implement the URL redirect. With the URL redirect installed on web server 106, the custom domain name has been created. Accordingly, in step 510, the user can be notified that the custom domain name has been correctly setup for the third party service.

In situations where the third party service provided email services, host 102 may be configured to retrieve MX and SPF records for the third party service from the third party service link database. Once received, those MX and SPF records may be utilized to automatically configure the third party service to host email services for the custom domain name.

In some embodiments, once the custom domain names have been implemented (e.g., using the method of either FIG. 4 or FIG. 5), host 102 may provide the user with a preview of the operation of the custom domain name (e.g., by popping up a browser window directed to the custom domain name) to provide the user with an opportunity to confirm the successful operation of the custom domain name. If the user is happy with the custom domain name's operation, the custom domain name (and the corresponding DNS, web server, and third party service settings) can be made permanent. Alternatively, if the user is not happy with the custom domain name's operation, the changes can be cancelled allowing the user to setup the custom domain name differently.

Once a custom domain name has been created for the user, the user will be able to access a configuration tool for their domain name's DNS settings and view the new entries that were created by host 102 to implement the custom domain name.

In the present system, the DNS entries that were created as a result of the creation of a custom domain name (e.g., via the performance of the methods of FIG. 4 or FIG. 5), may be locked so that they cannot be edited or revised by the user. This can provide at least two benefits. First, the DNS entries can be complicated—even relatively minor errors in the DNS records for a particular domain name could result in the domain name (and its sub-domains) not operating as desired. As such, the locking of those DNS entries prevents inadvertent errors being created, which may render the custom domain names inoperative. Second, although the domain name entries are locked to the user, they can still be edited by host 102. This allows host 102 to update the entries when changes are made the third party service link database. For example, if the IP address associated with a third party service changes in the third party service link database, host 102 can automatically update all DNS entries that have been created for users in DNS records 104 for that third party service.

Similarly, if a third party service switches from a URL redirect-based custom domain approach to a DNS-based approach, host 102 can automatically update the settings of users who have previously implemented URL redirect-based custom domain names for that third party service.

To illustrate, FIG. 7 is a screenshot showing an example control panel for the DNS records for a domain name in which a number of records are locked. Referring to FIG. 7, the DNS records for the domain name 'photoprocessing.com' are presented. As illustrated the user interface includes a number of DNS records 650 for the domain name. The records in this example include an A record entry and an MX (mail) entry.

As indicated by icon 652, the A record has been created to implement a custom domain name link to the third party application TUMBLR. That record, then is locked and cannot be edited by the user. Instead, the user is only presented with the option to delete the custom domain name link using button 654. Similarly, as indicated by icon 656, the MX record and any other corresponding DNS records required to implement the email services have been created to implement a custom domain name link to the third party application OFFICE365. Those records are then locked and cannot be edited by the user. Instead, the user is only presented with the option to delete the custom domain name link using button 658.

In the system described above, settings are stored in a third party service link database enabling the automatic (or semi-automatic) creation of custom domain names for a number of different third party services.

In some implementations, the user may want to create a custom domain name for a third party service for which the user cannot identify a specific button 204. In that case, the user may select the button 206 to create a custom domain name for a third party service of 'other'. Once the user has selected that button, they are presented with the user interface depicted in FIG. 8.

Figure 8:
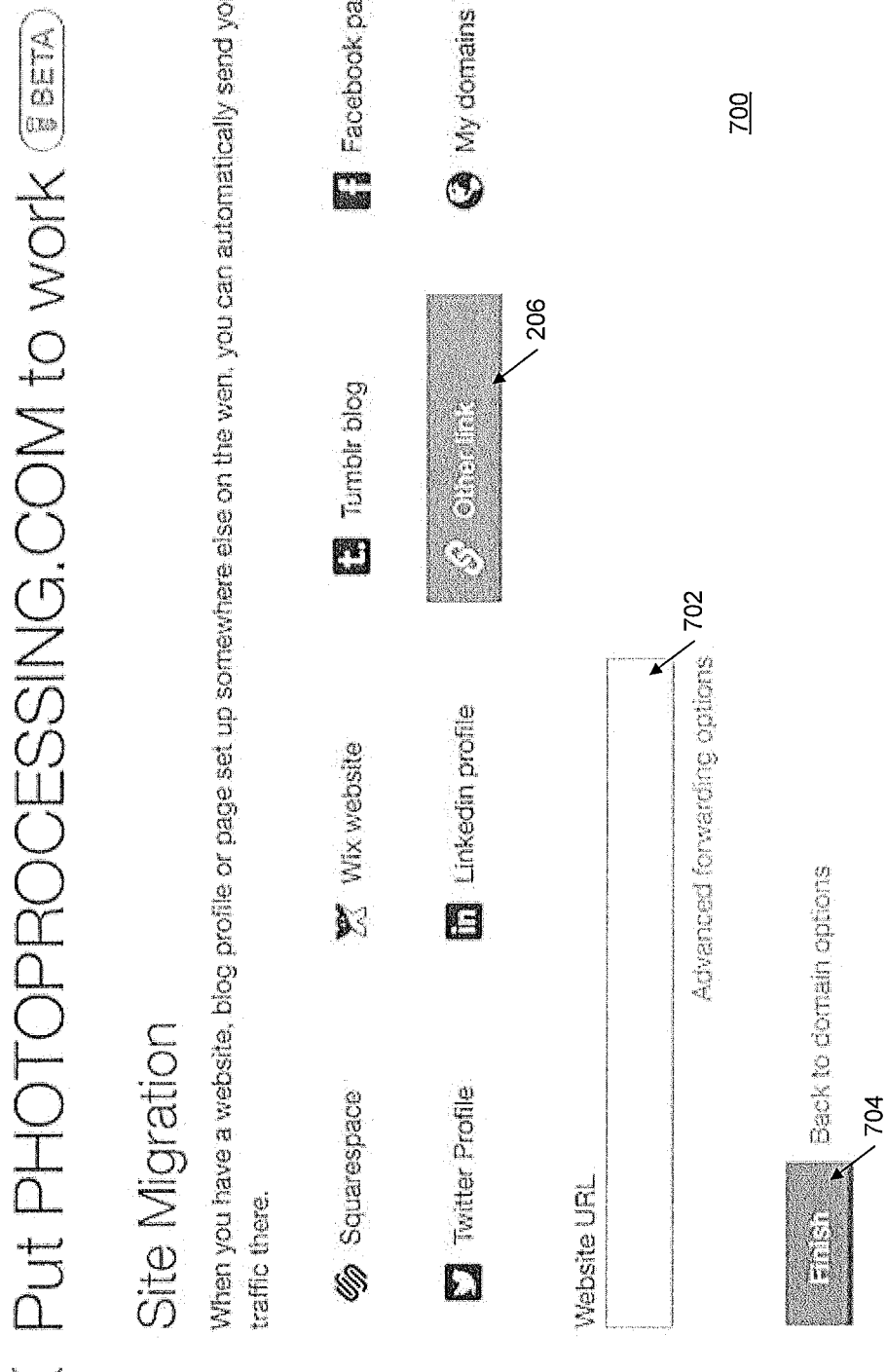
FIG. 8 is a screenshot showing an example user interface 700 enabling a user to create a custom domain name for a third party service.

FIG. 8 is a screenshot showing an example user interface 700 enabling a user to create a custom domain name for a third party service. After the user has selected the button for the 'other' third party service, the user is presented with a text box 702 allowing the user to paste a URL. The URL pasted into text box 702 will be a URL pointing to the third party service for which the user wishes to create a custom domain name.

Figure 9:
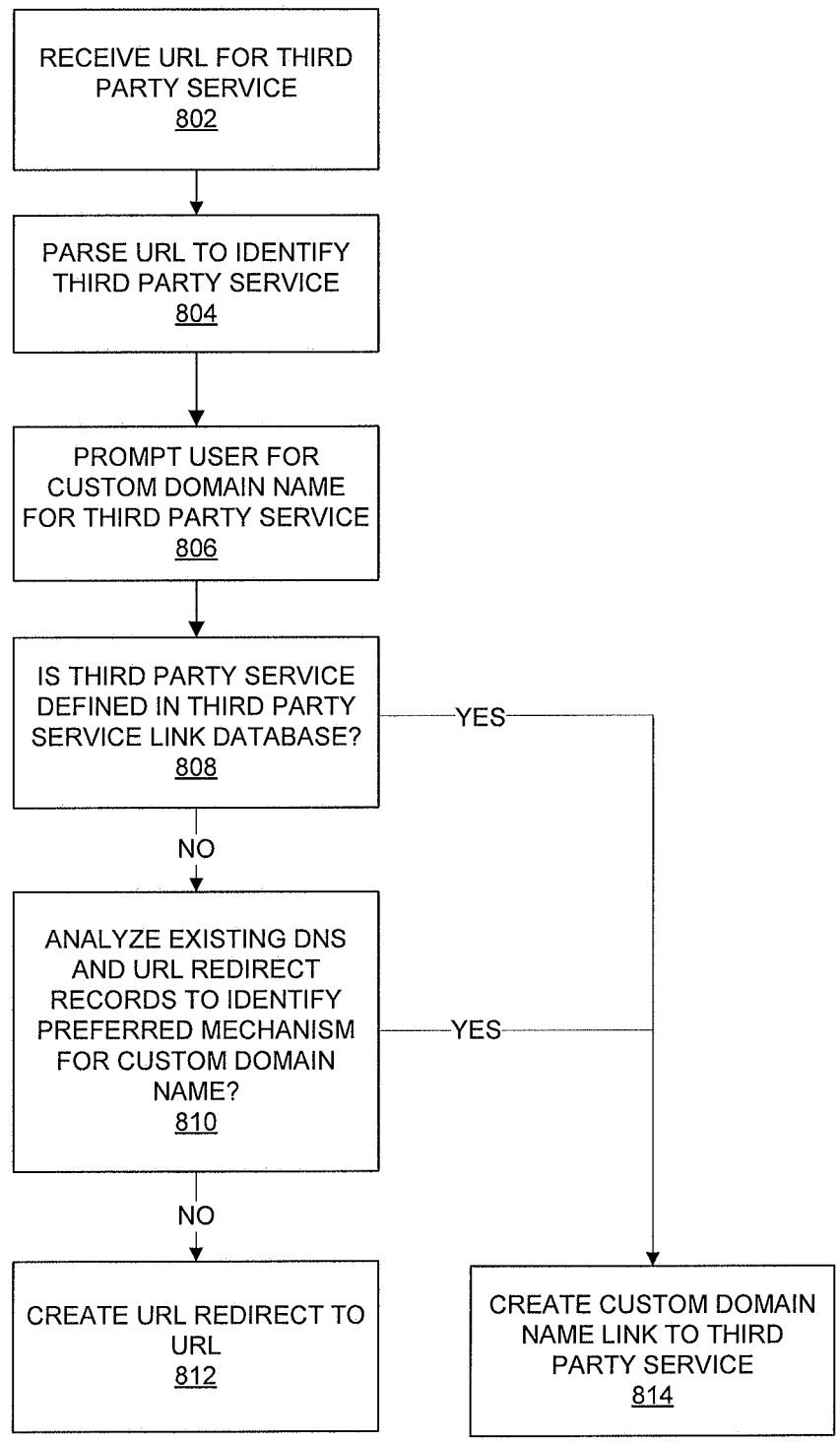
FIG. 9 is a flowchart depicting a method that may be performed by a host upon receiving a URL entered by the user to create a custom domain name for a third party service hosting the URL.

For example, if the user wishes to create a custom domain name to reference a particular website on a third party service (e.g., 'http://www.ebay.com/stores/samples), the user would paste that URL into text box 702. With the URL pasted into text box 702, the user can press the finish button 704 to submit the URL to host 102 and initiate the process of creating a custom domain name for the URL. FIG. 9 is a flowchart depicting a method that may be performed by host 102 upon receiving the URL entered by the user to create a custom domain name for the associated third party service.

Referring to FIG. 9, in step 802 the URL submitted by the user is received. In step 804, the URL can be parsed to identify the third party service. This involves identifying the SLD in the submitted URL, which will generally identify the third party service. In the present example URL of 'http://www.ebay.com/stores/samples', the third party service would be identified as 'ebay'. In this step, the URL is further parsed to identify any sub-domain that may be identified in the URL. In this example, the sub-domain is 'www', though other sub-domains such as 'mobile' or 'm' may be identified within the URL.

In step 806, the user is prompted to provide a custom domain name for the third party service. In some cases, the user may be provided with a blank form in which to enter the custom domain name (see, for example, form 302 on FIG. 3). In other cases, however, the custom domain name may be pre-populated based upon the parsing of the URL performed in step 804 or, alternatively, step 806 may be option and the user's domain name may be utilized directly as the custom domain name. The custom domain name, for example, may be pre-populated with the name of the service identified in step 804. In that case, in the present example the custom domain name suggested may be 'ebay.photoprocessing.com'.

After the user has either provided the custom domain name or accepted the suggested custom domain name, in step 808 a search is performed to determine whether an entry is provided for the third party service in the third party service link database, described above. This determination may be made, by identifying whether one or more entries exist where the name defined in the third party service link database is equal to the name of the third party service identified in step 804.

If so, then the appropriate entry is selected and a custom domain name link is created accordingly in step 814. This may involve, for example, the execution of one of the methods shown in FIG. 4 and FIG. 5 and described above. In this step, if a sub-domain of 'mobile' or 'm' was identified in the URL, then a mobile entry for the third party service in the third party service link database would be used, if available.

If, however, an entry does not exist in the third party service link database for the third party service, in step 810, host 102 may be configured to analyze all available records in DNS records 104 and all URL redirects created on web server 106 in order to identify a preferred mechanism for creating custom domain names to the third party service. If, as a result of this analysis, host 102 determines that there are a large number of URL redirects pointing to the third party service, that may indicate that the third party service does not accept DNS-based custom domain names. In that case, the method may move to step 814 where a custom domain name link is created using a URL redirect that points the custom domain name provided by the user in step 806 to the URL received from the user in step 802.

Conversely, the analysis performed in step 810 may determine that there are a large number of DNS entries pointing to the third party service, with relatively few URL redirects pointing to the third party service. That may indicate that the third party service accepts DNS-based custom domain names. In that case, the method may move to step 814 where a DNS-based custom domain name is created and the user is prompted to access the third party service to create the appropriate custom domain name mapping.

Finally, in step 812, if no suitable mechanism has been identified for creating a custom domain name link to the third party service, a URL redirect may be created to point the custom domain name to the URL received in step 802.

In addition to creating custom domain name links, the present system allows for the creation of DNS templates that can set forth a number of DNS settings that can be associated with a particular domain name. Once created, a DNS template can be applied to one or more domain names, and uploaded to and distributed through an Internet-accessible repository, such as a DNS template marketplace. In some cases, the DNS template system, as described below, can be utilized to create or define DNS settings snapshots allowing the DNS settings associated with a particular domain name to be reverted to a prior set of settings.

A DNS template may set forth all DNS settings associated with a particular domain name (in some cases, referred to as a DNS zone). In other cases, however, a DNS template may only set forth a subset of DNS settings that may be specified for a particular domain name. For example, a DNS template could be created to specify a single A record pointing a domain name to an IP address. An example of this could be a DNS template that sets forth a link between a domain name beginning with 'photos.' to a particular IP address. Such a template could be used by a photo sharing website, for example, to define how users can link their domain name to the photo sharing website. An example of such a DNS template follows:

| [DNS Template - Photo Sharing] | | | |
|---|---|---|---|
| photos | IN | A | 192.168.0.3 |

In some cases, the DNS templates could specify a number of different DNS settings for a particular domain name. For example, a DNS template could be created that specifies a number of MX records that can be used to configure a domain name for email delivery. An example of such a DNS template follows:

| [DNS Template - Email Hosting] | | | |
|---|---|---|---|
| @ 3600 | MX | 1 | mail1.emailhosting.com |
| @ 3600 | MX | 5 | mail2.emailhosting.com |
| @ 3600 | MX | 5 | mail3.emailhosting.com |
| @ 3600 | MX | 10 | mail-alternate.emailhosting.com |

In some cases, DNS templates can be created that provide a comprehensive set of DNS settings for a domain name. For example, the following example DNS template contains DNS settings to specify IP addresses for a number of subdomains, a domain name alias, MX records for email services, and a number of name servers.

| [zone template - business software suite] | | | |
|---|---|---|---|
| accounting | IN | A | 192.168.0.3 |
| hr | IN | A | 192.168.0.4 |
| www | IN | A | 192.168.1.158 |
| www-beta | IN | CNAME | www |
| @ 3600 | MX | 1 | mail1.emailhosting.com |
| @ 3600 | MX | 5 | mail2.emailhosting.com |
| @ 3600 | MX | 5 | mail3.emailhosting.com |
| | IN | NS | 192.168.1.1 |
| | IN | NS | 192.168.1.2 |

In some embodiments, a number of DNS templates (e.g., a set of DNS templates) could be applied in combination to apply settings to a domain name root as well as related subdomains. Because each subdomain may have an individual zone file, the set of DNS templates could set up the subdomains and root appropriately.

The DNS templates, once created, may be stored in any suitable format. In one embodiment, the DNS templates may be stored as text documents using similar formatting requirements to those established for conventional DNS records. Alternatively, the DNS templates may be stored in a marked-up format, such as using eXtensible Markup Language (XML) or another format and stored within a suitable data storage device.

In one embodiment, a DNS template can be created by a user from DNS settings established in an existing zone file associated with an original domain name. For example, a user, having configured a number of DNS settings for the original domain name may want to use those settings (or at least a subset of those settings) to create a DNS template. That DNS template, once created, could then be applied to the DNS settings for a number of other domain names to quickly and accurately duplicate DNS settings across a number of domain names.

Figure 10A:
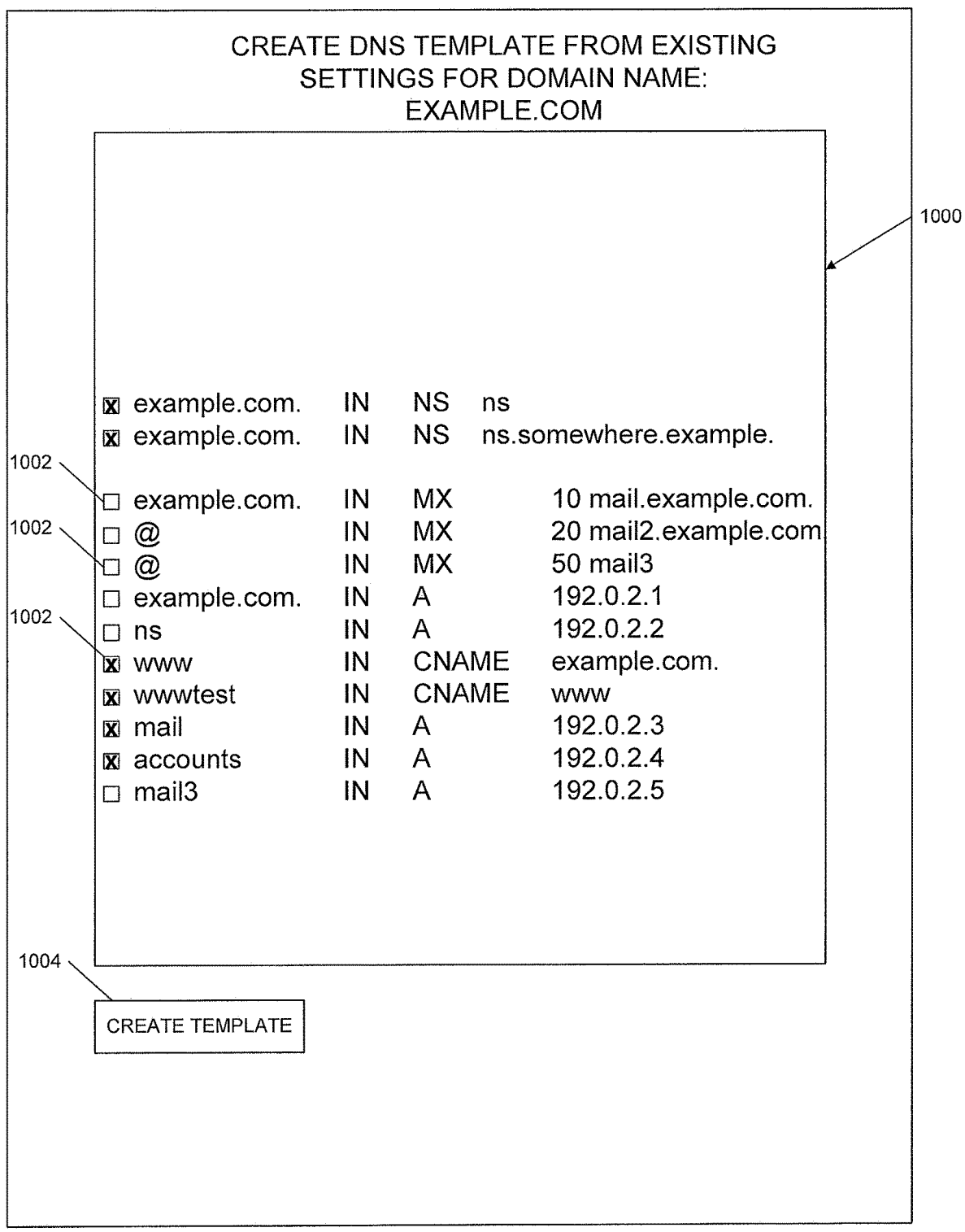
FIG. 10A shows a user interface for creating a DNS template from existing DNS settings.

As an illustration, FIG. 10A shows a user interface 1000 for creating a DNS template from existing DNS settings. In the example depicted in FIG. 10A, a user wishes to create a DNS template from DNS settings associated with the original domain name 'example.com'. To create the DNS template, the user accesses a software application provided by, for example, host 102, The application retrieves the current DNS record for the domain name 'example.com' and display the contents of the record in user interface 1000. This may involves parsing the DNS record for the domain name into a number of different DNS settings. The DNS record may be parsed so that each individual record is designated as a separate DNS setting. The DNS record may be retrieved by host 102, for example, from DNS records 104, shown on FIG. 1.

After the records have been displayed in user interface 1000, the user is provided with a number of user interface elements 1002 enabling the user to select one or more of the individual settings depicted in user interface 1002. In the example shown in FIG. 10A, each setting is presented on a separate line and user interface elements 1002 include checkboxes, though any other suitable user interface element may be utilized to enable the user to provide a selection of one or more of the settings in the DNS record via user interface 1000.

As illustrated in FIG. 10A, the user has selected settings that set forth a particular set of name servers for the domain (the NS records), as well as a number of IP addresses (the A records) and aliases (the CNAME records) for a number of subdomains.

After the user has selected the settings from the DNS records that are to be placed into the DNS template, the user activates button 1004 to initiate DNS template creation. After the user activates button 1004, the DNS records selected by the user are analyzed and placed into a DNS template for later use, as described below.

Figure 10B:
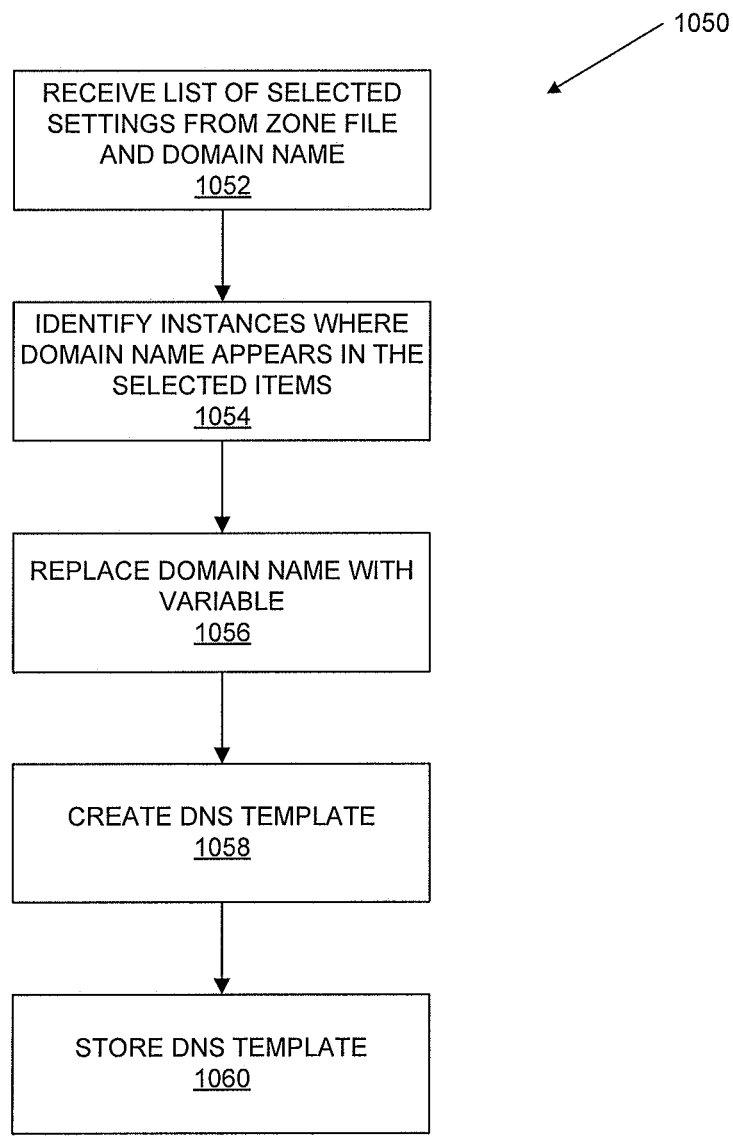
FIG. 10B is a flow chart depicting a method for creating a DNS template after receiving a set of DNS settings.

FIG. 10B is a flow chart depicting method 1050 for creating a DNS template based upon a set of DNS settings selected by a user. The method may be executed, for example, by host 102 after the user has activated button 1004 shown in FIG. 10A.

In step 1052, the list of the items selected in the DNS settings (see, for example, FIG. 10A) are received from user interface 1000. The list may include the settings directly, or may include a number of references to storage locations (e.g., within DNS records 104) from which the settings can be retrieved.

With reference to the example depicted in FIG. 10A, step 1052 involves receiving the following listing of items from the DNS record associated with the original domain name 'example.com':

| example.com. | IN | NS | ns |
| example.com. | IN | NS | ns.somewhere.example. |
| www | IN | CNAME | example.com. |
| wwwtest | IN | CNAME | www |
| mail | IN | A | 192.0.2.3 |
| accounts | IN | A | 192.0.2.4 |

In addition to receiving the selected DNS settings, in step 1052, the domain name originally associated with the settings (i.e., 'example.com') is also received.

Because some of the DNS settings received in step 1052 are specifically tailored to work with the domain name 'example.com' the method involves stripping the original domain name from the settings. This makes the settings generic and suitable for application to other domain names and generally involves replacing the original domain name with a variable (e.g., a text string) that can then later be replaced by a new domain name when the DNS template is used to create DNS settings for the new domain name.

This is generally the case for all instances where the original domain name appears in the DNS settings, except where the original domain name appears as a specified nameserver or mailserver (e.g., as the value in an NS setting or MX setting). In some cases, the DNS settings may use a character such as '@' to refer to the primary domain name associated with the DNS settings. In that case, the '@' character may be retained (i.e., left unchanged) when the DNS template is created. Alternatively, in some embodiments, instances of the domain name may be replaced with the variable '@' in the DNS template.

Accordingly, in step 1054 the DNS settings received in step 1052 are analyzed to identify instances of the domain name originally associated with the settings (except where the domain name appears as a specified nameserver or mail server). Then, in step 1056, the instances of the domain name identified in step 1054 are replaced with a suitable variable. In the present example, the variable will be the string '[domain name]', though any suitable variable may be utilized. It is only necessary that the variable, at a later time, can be replaced by a different domain name to create a set of DNS settings for that domain name, as described below.

As such, with reference to the present example, after performing step 1056, the DNS settings will be as follows:

| [domain name]. | IN | NS | ns |
| [domain name]. | IN | NS | ns.somewhere.example.com. |
| www | IN | CNAME | [domain name]. |
| wwwtest | IN | CNAME | www |
| mail | IN | A | 192.0.2.3 |
| accounts | IN | A | 192.0.2.4 |

It is apparent, therefore, that in all instances the original domain name 'example.com' has been replaced by the variable '[domain name]', except where the domain name 'example.com' is a specified nameserver or mail server in the DNS settings. The modified DNS settings can then be incorporated into a DNS template in step 1058.

After the DNS template has been created in step 1058, the DNS template can be stored in any suitable computer-readable medium in a DNS template database, such as in database 107, which is accessible to host 102, in step 1060 for later use. Step 1060, which involves the storing of the DNS template, may also involve receiving from the user a suitable descriptive name for the DNS template. The descriptive name can be stored in conjunction with the DNS template to facilitate retrieval and use by a user at a later time.

In some embodiments, instead of requiring that the user select one or more DNS settings for a particular domain name in order to create a DNS template, the user may instead be presented with the option of selecting one or more categories of DNS settings for incorporation into a DNS template. With reference, to FIG. 10A, for example, instead of being presented with an opportunity to select each individual DNS setting, the user may instead be presented with the option of selecting the collection of name server records, mail records, A records, and/or CNAME records for incorporation into a DNS template. This approach may simplify the user interface for the user making it easier to identify the desired records for the DNS template.

In some cases, the system may automatically select which DNS settings are to be incorporated into the DNS template, and may, therefore, create a DNS template for the DNS settings of a particular domain name without any selection of particular settings by a user. For example, the system may be configured so that a user, when viewing the DNS settings associated with a particular domain name, can create a DNS template with a single user input. In such an embodiment, the system may be configured to create a DNS template using all A and CNAME records for the domain name, but to ignore nameserver and MX records, for example. Alternatively, a user may create a DNS template by selecting a pre-ground category of DNS settings (e.g., all DNS settings associated with the web service TUMBLR).

Figure 11:
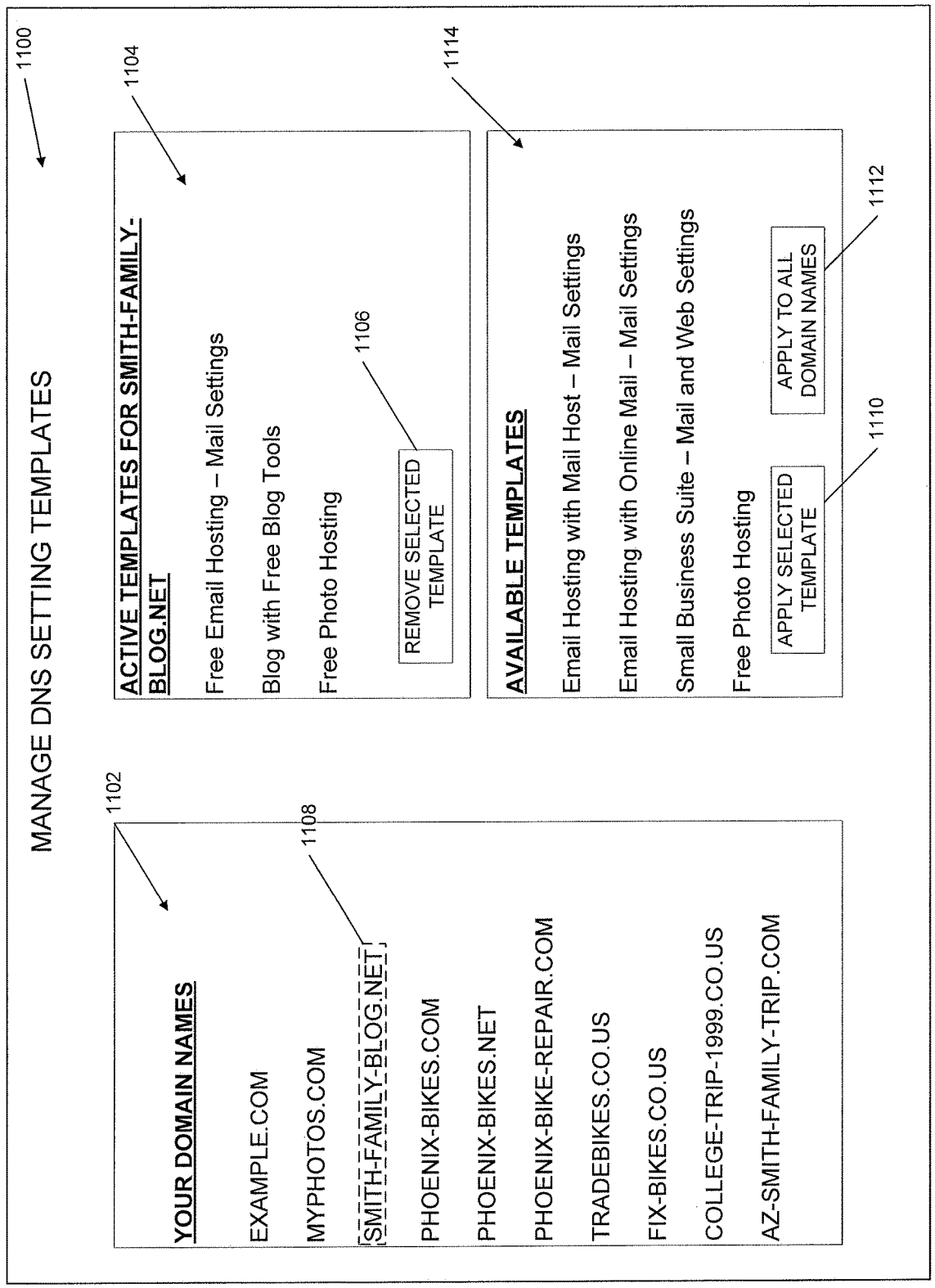
FIG. 11 is a screenshot showing an example user interface for a user to manage the application of a number of DNS templates to a number of domain names.

Once the DNS template has been created and stored, the user can manage the DNS template, which may involve applying the template to one or more other domain names registered by the user. FIG. 11 is a screenshot showing an example user interface for a user to manage the application of a number of DNS templates to the DNS settings for a number of domain names.

User interface 1100 may be generated, for example, by a software application running on host 102 and shows a number of settings and options associated with the domain names registered to a particular user. User interface 1100 includes window 1102 that displays a listing of domain names that are registered to the user. In this example, the user has selected one of the domain names, as indicated by selection graphic 1108.

Window 1104 display a listing of DNS templates that have been applied to the domain name selected in window 1102. In this example, the user has selected the domain name 'smith-family-blog.net'. The DNS templates active for that domain name are shown in window 1104 and include the template 'Free Email Hosting Mail Settings', which may include a number of DNS settings associated with providing email services, the template 'Blog with Free Blog Tools', which may include a number of DNS settings enabling the user to host a blog, and the template 'Free Photo Hosting', which may include a number of DNS settings enabling the user to utilize a free online photo hosting site.

Window 1104 includes button 1106, which enables a user to remove a DNS template from the selected domain name. To remove a template, a user would first select a domain name in window 1102 and then select one of the templates that has been applied to the selected domain name in window 1104 (e.g., by clicking on the DNS template). The user would then click button 1106 to initiate removal of the DNS template. Removal would involve host 102 modifying the DNS records for the domain name and deleting each entry in the DNS record that was created from the selected DNS template.

Window 1114 displays a listing of templates that are available for use by the user. The available DNS templates may have been previously created by the user (e.g., using the user interface and methods of FIGS. 10A and 10B), or, alternatively, the DNS templates may have been download or added from another source, such as a DNS template marketplace. Using window 1114, a user can select one of the available DNS templates and then apply the selected DNS template to one or more of the user's domain names. For example, the use could select one of the available templates in window 1014 and select one of the domain names in window 1102. The user could then click button 1110 to apply the selected DNS template to the selected domain name. Alternatively, having selected one of the available templates listed in window 1114, the user could instead click button 1112 to have that template applied to all domain names registered to the user (e.g., all the domain names contained in window 1102). After clicking button 1112, therefore, the settings from the selected DNS template would be applied across all the user's domain names.

Figure 12:
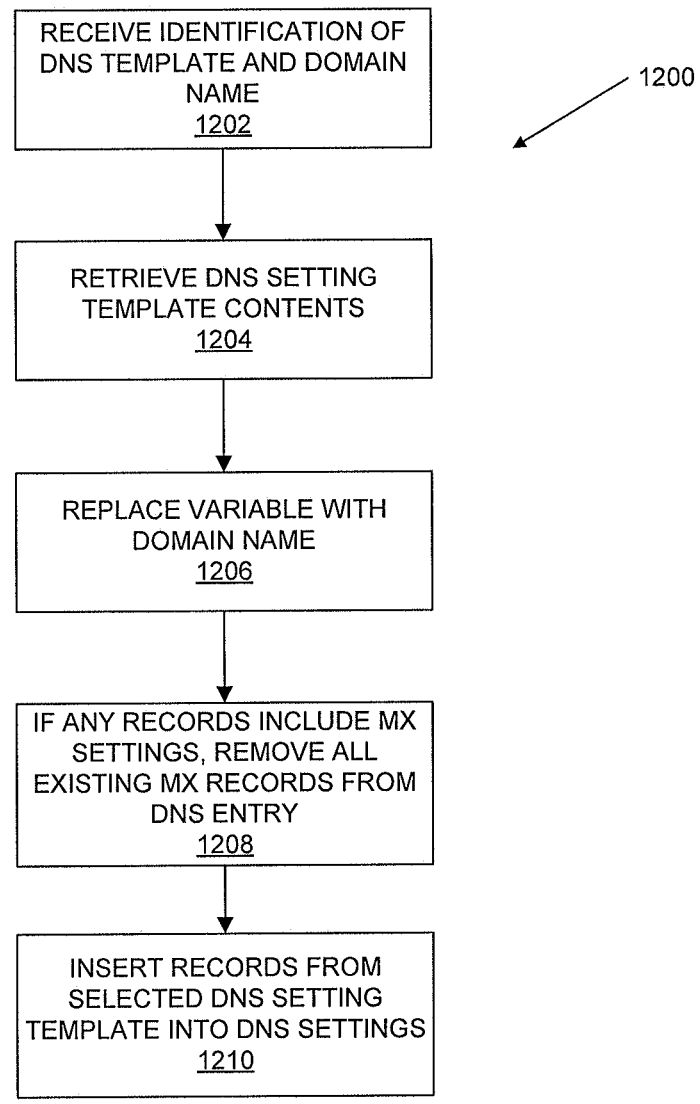
FIG. 12 is a flowchart illustrating an example method for applying a DNS template to a domain name.

FIG. 12 is a flowchart illustrating an example method 1200 for applying a DNS template to a domain name. Method 1200 may be executed, for example, after a user selects one of the domain names in window 1102 of FIG. 11 and one of the templates listed in window 1114 and then activates button 1110 to apply the selected template to the selected domain name. In the case that multiple domain names are selected (or, if the template is to be applied to all domain names registered by the user), method 1200 may be executed for each domain name. Method 1200 may be performed, for example, by host 102.

In step 1052, an identification of the DNS template and the domain name to which the template is to be applied are received. For example, if the user has selected one of the templates in window 1114 of FIG. 11, step 1052 may involve receiving an identification number or code for the selected template and an identification of the selected domain name. After the identification of the DNS template to be applied is received, in step 1204 the contents of the identified DNS template are retrieved. This may involve, for example, host 102 retrieving the contents of the DNS template from the DNS template database stored in database 107, in which a number of different DNS templates may be stored.

After the contents of the DNS template are retrieved, in step 1206 the contents of the DNS template are analyzed to identify any domain name variables. If so, those variables are replaced with the domain name to which the DNS template is to be applied. As mentioned above, the identification of the domain name is received in step 1202. In embodiments, where the DNS template includes an '@' character (i.e., a character defined by DNS standard to refer to the primary domain name itself), the '@' character may be left intact and processed on the fly to refer to the domain name to which the DNS template is to be applied.

To illustrate, a DNS template may include the following entries:

| [domain name]. | IN | NS | ns |
| [domain name]. | IN | NS | ns.somewhere.example.com. |
| www | IN | CNAME | [domain name]. |
| wwwtest | IN | CNAME | www |

If the domain name to which the DNS template is being applied is mikes-bikes.com', step 1206 would involve replacing each of the variables '[domain name]' with the domain name 'mikes-bikes.com'. As such, in this example, after performing step 1206 the contents of the DNS template would be as follows:

| mikes-bikes.com. | IN | NS | ns |
| mikes-bikes.com. | IN | NS | ns.somewhere.example.com. |
| www | IN | CNAME | mikes-bikes.com. |
| wwwtest | IN | CNAME | www |

In step 1208, host 102 determines whether the DNS template includes any settings setting forth MX records. If so, host 102 removes any pre-existing MX records for the domain name to which the DNS template is to be applied. This step ensures that if the DNS template does contain MX records they don't conflict with any existing MX records that may already exist for the domain name. Before removing the pre-existing MX records, the user may be presented with a warning and asked for confirmation for host 102 to proceed with the removal of the pre-existing MX records.

In step 1210, the records from the DNS template (following the insertion of the domain name in step 1206) are inserted into the DNS record for the domain name. The updated DNS record could then be made live for the domain name so that the new settings get promulgated out into the DNS. Or, alternatively, the user could be presented with a confirmation screen showing the new domain name DNS settings following application of the DNS template. Then, if the settings appear to be correct, the user can confirm that the changes should be implemented, at which time the settings will go live.

During the execution of step 1210, host 102 may be configured to determine whether any of the settings specified in the DNS template will conflict with any of the existing DNS settings for the domain name. For example, host 102 may determine whether the a setting in the DNS template is attempting to change a pre-existing DNS setting (e.g., a CNAME or MX record). If so, host 102 could provide the user with a warning than an existing record is being changed and ask the user to confirm that the change should be made. Alternatively, if no conflict is detected, host 102 may implement the change automatically.

In some embodiments, if a conflict is identified, the user may be prompted to indicate whether the existing setting or the new setting taken from the DNS template is to take precedence. In which case, the record that takes precedence with be entered into the DNS record for the domain name and the other record will either be deleted or not added to the DNS record.

At the completion of method 1200, host 102 may store a record in database 107 indicating that the selected DNS template has been applied to the domain name. This record can then be utilized when displaying user interface 1100 to identify, for a particular domain name, which DNS templates have been applied or are active as shown in window 1104.

Once a DNS template has been applied to a domain name, the DNS settings created from the DNS template can be locked so that they cannot be edited or otherwise modified by the user. In that case, when the user attempts to manually edit the DNS record for a domain name any settings that were generated via a DNS template may be uneditable, preventing any changes. In that case, the user will only be able to remove the DNS template, thereby deleting any DNS settings that were created by the template.

As mentioned above, a user may elect to create a DNS template using an existing DNS record for one of the user's domain names. In other embodiments, however, DNS templates may be published by third parties and made available for download by the user. In this manner, the user can download and utilize DNS templates created by third parties. Such an implementation may be useful, for example, to allow companies or online service providers to provide DNS templates that include a number of settings configured specifically for their online services enabling users to quickly and easily configure their own domain names to work with those services.

For example, a service provider that provides online email services could distribute a DNS template that includes a number of MX settings. Users that wish to utilize the company's email services could simply install that DNS template into the DNS record for their domain name to use the service provider's email services.

In another example, a company that provides a suite of online services could distribute a DNS template that include a comprehensive set of settings to configure a domain name to utilize the company's name servers, email servers, and other online services.

When generating a DNS template to be distributed to other users, the DNS template could be created in a similar manner to that depicted by the method of FIG. 10B. As such, a company wishing to distribute a DNS template could access their own DNS records and select a subset of DNS settings to be incorporated into a DNS template. Alternatively, the DNS template could be constructed by hand, or using a tool or software application to facilitate the creation of a DNS template.

Once created, the DNS templates could be distributed to the other users via a DNS template marketplace. Once uploaded to the marketplace, a user could access the DNS template marketplace to browse available DNS templates, read about the contents of the DNS templates, and select one or more of the available DNS template for download or purchase.

Figure 13:
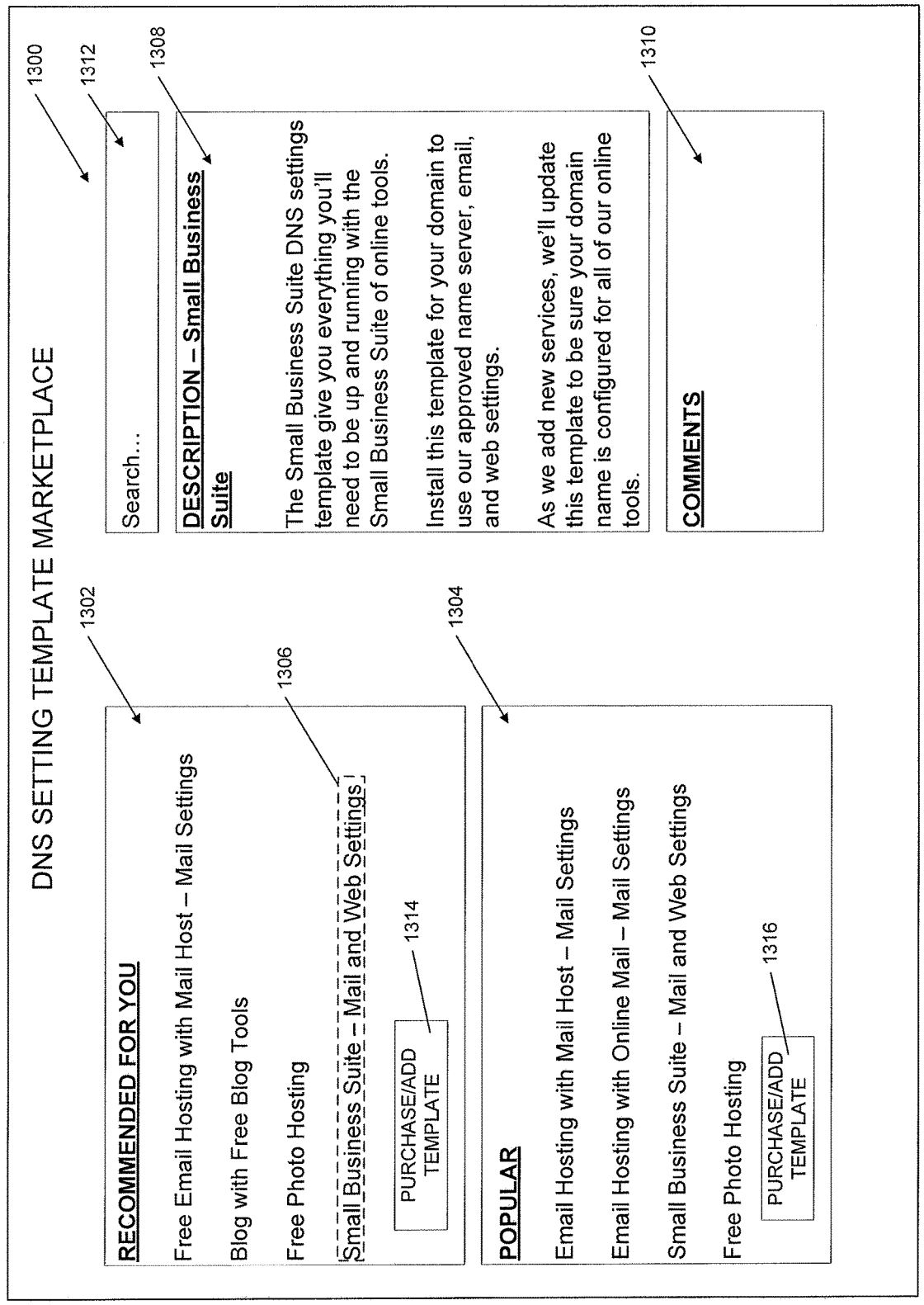
FIG. 13 is a screenshot depicting an example user interface enabling a user to browse a number of available DNS templates via a DNS template marketplace.

FIG. 13 is a screenshot depicting an example user interface 1300 enabling a user to browse a number of available DNS templates via a DNS template marketplace. After a user provides authentication credentials, host 102 can display user interface 1300, which provides a number of display options and content that are tailored to the user.

As illustrated, user interface 1300 includes window 1302 that lists a number of DNS templates that are recommended for the user. The identification of the DNS templates that are recommended could be based upon any suitable factors.

For example, host 102 may have a record of a user account of the user that indicates the user has signed up for a particular third party service. In that case, if the company operating that third party service has published a DNS template within the marketplace, that DNS template could be listed as a "Recommended For You" DNS template. For example, the user's user account may indicate that the user wishes to utilize a third party email service provider. In that case, if the email provider has published a DNS template on the marketplace (e.g., a DNS template that includes a number of MX settings specifically configured to enable email services via the email provider), then that DNS template could be recommended to the user.

In other cases, the user's user account with host 102 may indicate that the user is operating a particular type of website. In that case, the recommendation of particular DNS templates could be based upon the type of website. For example, if the user is hosting a personal blog website, the recommended DNS templates could include those likely to be helpful to someone operating a personal website. Example DNS templates could include DNS templates for blogging services, photo sharing services, and the like.

However, if the user account indicates that the user is operating a business website, the recommend DNS templates could include those that may be useful to a small business owner, for example, Example DNS template could include those from companies providing email services, small business software services, online accounting services, and the like.

In still other cases, the DNS templates that are recommended to the user could be recommend at least partially based upon the location of the user as well as the location of the service provider associated with the templates. The user's location could be determined by host 102 based upon information contained within the user's user account or via a reverse IP address lookup or any other suitable mechanism. The service provider could similarly provide their own location as part of the DNS template upload process, or the location could be derived from an IP address of the service provider or an IP address contained within their uploaded DNS template. In that case, DNS templates may be recommended for service providers that are located nearby the user or within a particular geographical region encompassing the user.

User interface 1300 may also include window 1304 that displays a listing of popular DNS templates that can be retrieved from the marketplace. The popularity of a particular DNS template could be determined by the number of times the DNS template has been downloaded or purchased in the last 24 hours, last week, last month, or over some other time period. The ordering of templates displayed in either windows 1302 or 1304 could also be determined based upon the reviews and rankings of the DNS templates that have been provided by other users that have installed and utilized the DNS templates.

As in the case of recommended templates, the listing of popular templates could be limited to showing templates that are popular within a particular geographical region that encompasses the location of the user.

Using user interface 1300, a user can select one of the DNS templates shown in either window 1302 (Recommended For You) or window 304 (Popular) to view additional details about the selected DNS template.

In the example depicted in FIG. 13, the user has selected one of the templates in window 1302 with the title "Small Business Suite—Mail and Web Settings", as indicated by selection graphic 1306.

One the user has selected one of the available DNS templates, details about the DNS template can be displayed in window 1308. In various embodiments, the details include text and can be provided by the entity that created and distributed the DNS template. Generally, the details will include a description of the contents of the DNS templates. In some cases, user may submit comments or reviews of a particular DNS template, which may be uploaded to the DNS template marketplace. If any comments have been submitted for the selected DNS template, the comments can be displayed in window 1310.

User interface 1300 also includes a search box 1312 enabling a user to search for a desired DNS template.

In some cases, a DNS template in the DNS template marketplace may only be accessible to a limited number of users. For example, a company may only make their DNS template available to paying customers. In that case, if the user is not a paying customer of the company's product, the user will not see the company's DNS template in the DNS template marketplace. Instead, the user must first pay for the company's product and only then will the company's DNS template be available to the user for download.

Alternatively, some DNS templates may only be accessible to a particular class of users. For example, a set of DNS templates may only be accessible to user's that have a classification of 'professional' users (e.g., as specified in the user's user account with host 102), whereas normal non-professional users would not see those DNS templates.

In some cases, the entity uploading a DNS template to the marketplace may specify a price for the DNS template. In that case, before a user can download and utilize the DNS template, they must pay the price set by the uploading entity.

In other embodiments, an uploaded DNS template may be vetted for security considerations before being made available via the DNS template marketplace. This vetting may involve a manual review of all uploaded DNS templates to ensure that the templates do not create settings to, for example, surreptitiously send network traffic to a nefarious address. In some cases, only DNS templates that have been installed by more than a given number of users may undergo this vetting process before being made generally available.

Once the user utilizing user interface 1300 has identified a desired DNS template, the user can selected the DNS template and then purchase or download the template. With reference to FIG. 13, the user could select one of the DNS templates in either of windows 1302 or 1304 and then utilize one of buttons 1314 or 1316 to either download the DNS template or, if there is a cost associated with the selected DNS template, purchase the DNS template.

Once the selected DNS template is downloaded or purchased, the DNS template will appear as an available template for the user, for example, in window 1114 of user interface 1100 of FIG. 11. The user can then apply the DNS template to one the DNS records of one or more of the user's registered domain names.

In some embodiments, user interface 1300 may also include a listing of the user's registered domain names. In that case, the user could select one or more of the domain names in user interface 1300 and then be provided with an option to apply the downloaded or paid-for DNS template directly to the selected domain names.

When a DNS template is changed or modified, the present system is configured to identify all (or a subset of) the domain names for which the DNS template was installed, and make corresponding changes to the DNS records of those domain names. In this manner, a company that distributes a DNS template can issue updates or modifications that will be propagated out to all of the domain names using the template. For example, if a company issues a DNS template with a first set of DNS settings, which is ultimately installed by thousands of users, begins using a new IP address for a particular service, or wishes to change some other records, they would simply modify their own DNS template. That change would then automatically be distributed to the DNS records associated with each domain name using the DNS template.

Figure 14:
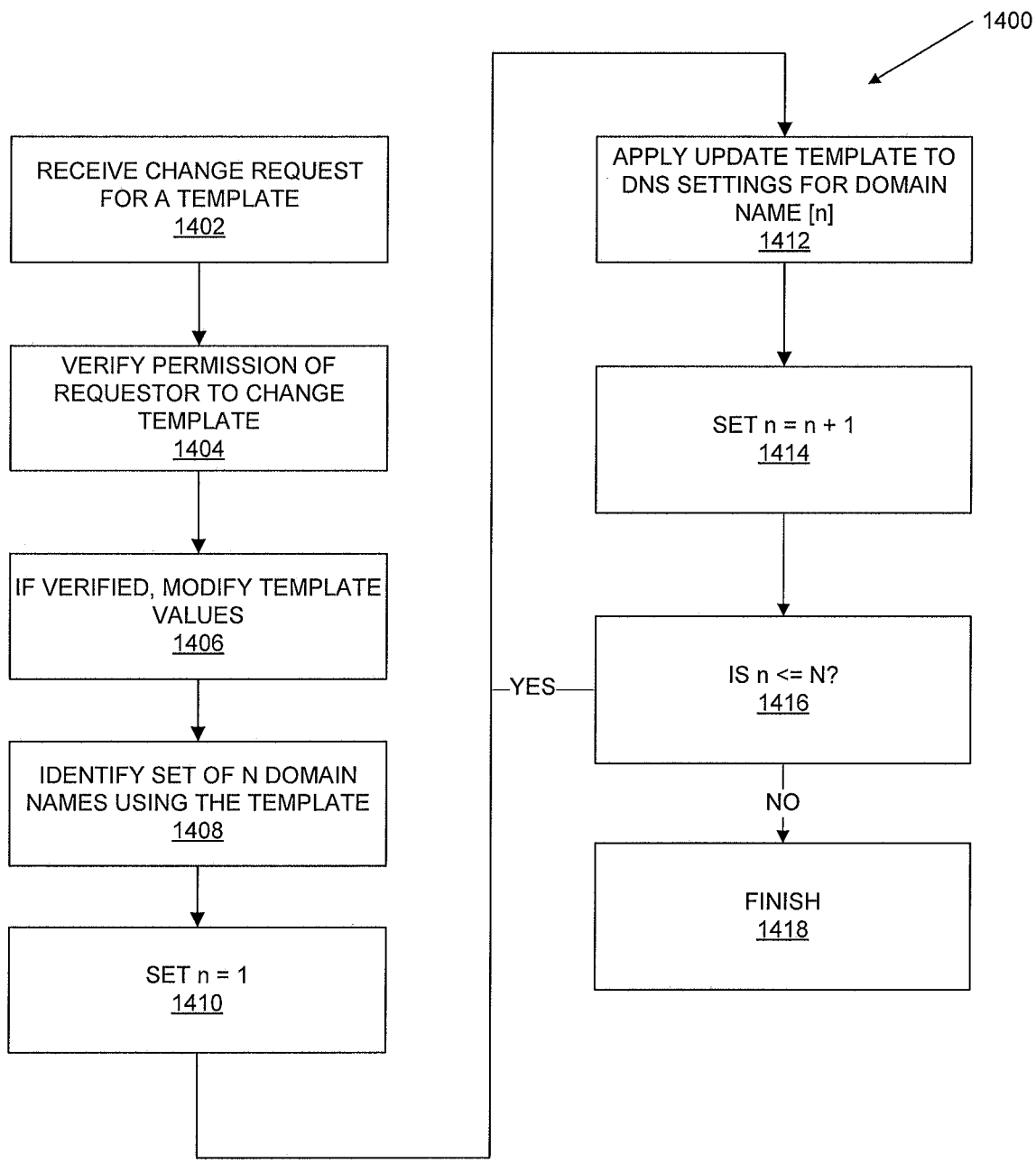
FIG. 14 is a flowchart illustrating a method for updating a DNS template and distributing those changes to the DNS records of a number of domain names.

FIG. 14 is a flowchart illustrating a method 1400 for updating a DNS template and distributing those changes to the DNS records of a number of domain names. Method 1400 may be executed, for example, by host 102.

In step 1402 a request to change a DNS template is received. The change request may identify a specific setting or value in the DNS template to be change, or may involving replacing the DNS template with an entirely new DNS template.

In step 1404, the requester of the change is identified and authenticated to ensure that the requester has sufficient permission to change the DNS template. This may, for example, involve prompting the requester to provide a username and password as authentication. If the user is authenticated, host 102 can confirm that the username is on a list of usernames authorized to make changes to the DNS template.

Once the requester is authenticated and confirmed to have sufficient permission to modify the DNS template, in step 1406, the DNS template is modified in accordance with the original request. As described above, the DNS templates may be stored in database 107. As such, step 1406 may involve accessing database 107 to modify the values of a DNS template pursuant to the request. This step may also involve a vetting process, whereby any changes made to a DNS template can be reviewed to ensure the changes to not create security concerns. This vetting may involve a manual review of all uploaded DNS templates to ensure that the templates do not create settings to, for example, surreptitiously send network traffic to a nefarious address. In some cases, only DNS templates that have been installed by more than a given number of users may undergo this vetting process before being made generally available. Alternatively, the vetting process may only be undertaken for changes that are considered significant. In one embodiment, changes to the last one or two digits of an IP address may be considered a minor change not requiring security review. But, a change to the first one or two digits of an IP address may be considered a major change requiring review.

After the DNS template has been modified, in step 1408 host 102 identifies a set of N domain names to which the DNS template has been applied. As discussed above, when a user applies a template to a domain name, host 102 creates a record in database 107 indicating that the DNS template has been applied. These records may be utilized in step 1408 to identify the set of domain names.

Once the set of domain names has been identified, method 1400 enters a loop that iterates through each of the set of N domain names and applies the updated settings from the DNS template to each domain name.

Accordingly, in step 1410 a counter n is set to a value of 1. Then, in step 1412, the updated DNS template is applied to the first domain name in the set of domain name. The application of the updated DNS template settings may be performed in a similar manner to the method illustrated in FIG. 12.

Namely, the contents of the updated DNS template are retrieved. This may involve, for example, host 102 retrieving the contents of the updated DNS template from database 107. After the contents of the updated DNS template have been retrieved, the contents of the updated DNS template are analyzed to identify any domain name variables. If any domain name variables are present, those variables are replaced with the domain name to which the updated DNS template is being applied.

Then, host 102 determines whether the updated DNS template includes any settings setting forth MX records. If so, host 102 removes any pre-existing MX records for the domain name to which the updated DNS template is to be applied. This ensures that if the updated DNS template does contain MX records they don't conflict with any existing MX records that may already exist for the domain name.

Finally, the records from the updated DNS template (following replacement of the domain name variables with the domain name) are inserted into the DNS record for the domain name. The updated DNS record could then be made live for the domain name so that the new settings get promulgated out into the DNS. Or, alternatively, the changes may not be fully implemented until the user is notified of the change and confirms that the change should be implemented. For example, the user may be provided with a confirmation email or any other electronic message informing the user that the DNS template has been changed and requesting the user confirm that the updated DNS template should be installed onto the user's domain name. If the user confirms that the installation should proceed, the settings will go live.

During the installation of the updated DNS template, host 102 may be configured to determine whether any of the settings specified in the updated DNS template will conflict with any of the existing DNS settings for the domain name.

In some embodiments, if a conflict is identified, the user may be prompted to indicate whether the existing setting or the new setting taken from the updated DNS template is to take precedence. In which case, the record that takes precedence with be entered into the DNS record for the domain name and the other record will either be deleted or not added to the DNS record.

After the updated DNS template settings are applied in step 1412, the counter n is incremented in step 1416. Then, in step 1416 host 102 determines when n is less than or equal to the value of N. If so, there remain a number of domain names to which the updated DNS template should be applied and the method will repeat steps 1412, 1414, and 1416. If not, all domain names using the updated DNS template have been updated and the method ends as step 1418.

In various embodiments, the present DNS template can be utilized in the creation of a backup or 'snapshot' of a number of DNS settings associated with a domain name.

As discussed above, a mistake in the DNS settings for a domain name can cause services hosted at the domain name to be unavailable for as long as 48 hours (24 hours to distribute the error through the DNS, detect the problem, and an additional 24 hours to distribute the correct DNS settings).

Given the importance of accurate DNS settings, the present system can store a number of snapshots of a domain name's DNS settings in the form of a number of different DNS templates. Should an error be detected in the DNS settings for the domain name, the snapshots allow a user to quickly and easily revert the domain name's DNS settings to a prior state, potentially correcting an error inadvertently introduced into the DNS settings. In one embodiment, the snapshot may be a data storage file containing one or more of the DNS settings for the domain name that were in place in the DNS at the time the snapshot was created. The snapshot may be a conventional text record (either a text file or a text record stored in a database) and may be formatted in accordance with conventional formatting requirements for DNS records or zone files. In other embodiments, however, the snapshots may be stored using any suitable file or database storage format and/or markup language. Once created, the snapshot can be stored in a suitable data storage device, such as a database 107. The snapshots can then later be retrieved as a backup copy of the DNS record to revert the settings back to a prior state.

Figure 15:
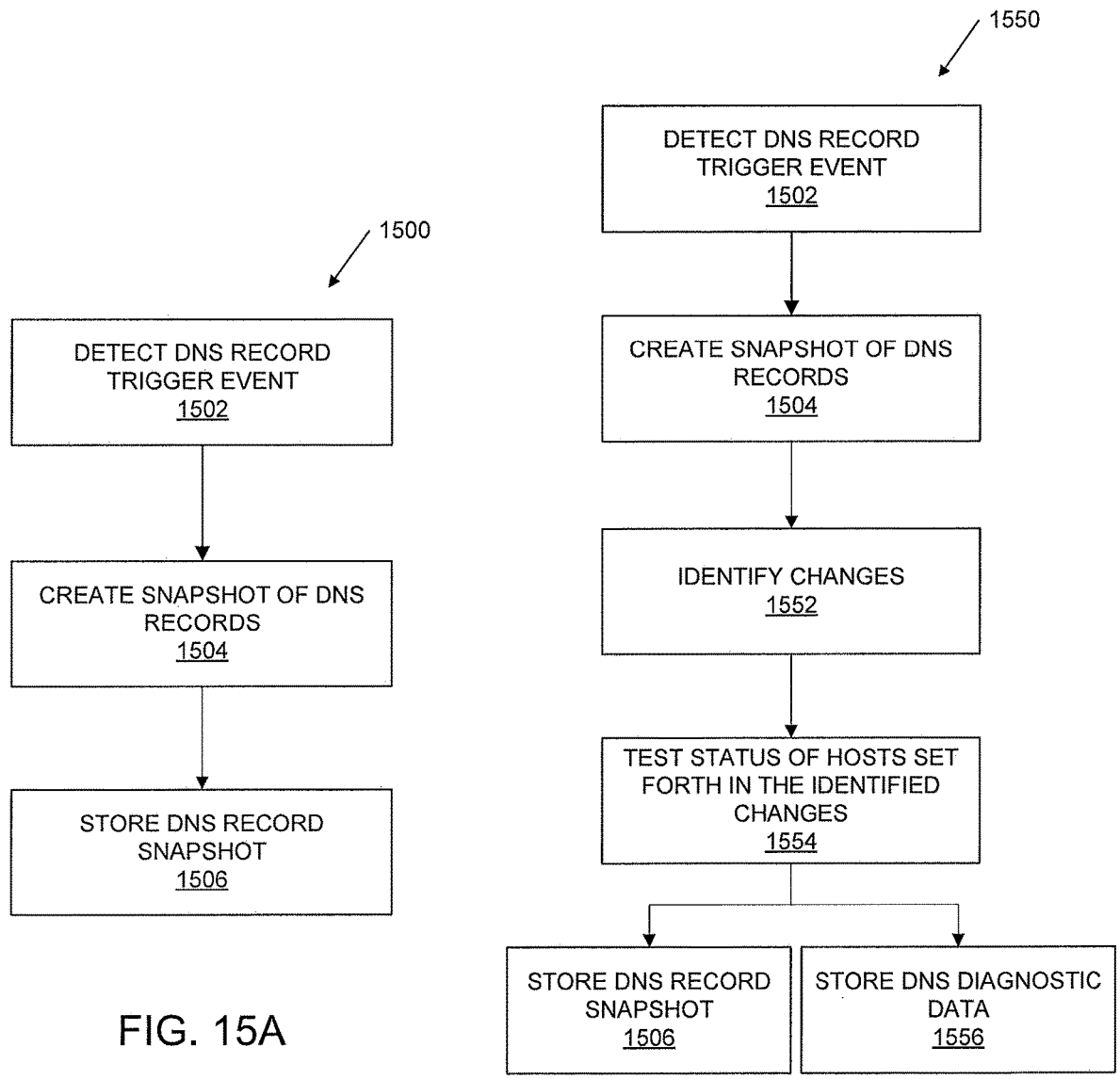
FIG. 15A is a flowchart illustrating a method for creating a DNS setting snapshot in accordance with the present disclosure.
FIG. 15B is a flowchart illustrating a method for creating a DNS setting snapshot in which additional diagnostic data is stored with the snapshot.

FIG. 15A is a flowchart illustrating a method for creating DNS setting snapshot in accordance with the present disclosure. Method 1500 may be performed, for example, by host 102 to create a snapshot of DNS settings associated with a domain name where the DNS settings are contained within a DNS record in DNS records database 104.

In step 1502, host 102 detects a DNS record trigger event for a DNS record associated with a domain name. The trigger event may include, for example, an initiation of a change to one or more of the settings associated with the DNS record. The change may be initiated, for example, by a user modifying one or more of the DNS settings via a suitable user interface, such as a domain name control panel, or other tool. Alternatively, the change may be initiated by a third party service. For example, the change may be introduced due to a user applying settings from a downloaded DNS template to the DNS record of a domain name. In additional to changes to the DNS record, a trigger event may include an explicit request to create a snapshot of the DNS settings. The request may come directly from the user requesting that the snapshot be created. Alternatively, the request to create the snapshot may come from a third party. For example, a user may work with customer service agents of their hosting provider for assistance in making one or more changes to the DNS settings associated with a particular domain name. In that case, before making any changes to the DNS settings on behalf of the user, the customer service agent may manually initiate creation of a snapshot of the DNS settings before making any changes. That snapshot could then be used to revert the DNS settings to the set of settings that were in existence before the customer service agent made any changes. In those cases, the explicit request for the creation of a snapshot constitutes the trigger event of step 1502.

In step 1504, after detecting the trigger event, a snapshot of the DNS record associated with the domain name is created. This may involve, for example, creating a DNS template for all DNS settings associated with the domain name. In one example, the snapshot may be created as a DNS template according to the method depicted in FIG. 10B and described in the corresponding written description, above. In other embodiments, however, because the snapshot serves as a backup to a specific domain name, there may be no requirement that the domain name itself be stripped from the DNS template. In that case, if the DNS template is created according to the method of FIG. 10B, there may be no requirement for the performance of steps 1054 and 1056.

In some embodiments, the snapshot includes copies of all DNS settings in effect at the time the snap shot is created. In other embodiments, however, the snapshot may only store the settings that have been changed—this presumes that the trigger event for the creation of the snapshot is an initiation of a change to the record.

In step 1506, after the snapshot has been created, the snapshot is stored for later retrieval. As mentioned above, the snapshot may be stored in any suitable data storage device, such as database 107.

In some embodiments, when the trigger event is a manual change being made to the DNS record, the user making the change may be prompted to provide a description of the change. This description could allow the user to describe why the change was being made, potentially assisting a user in later understanding why a particular snapshot was created. Additionally, the time and date at which a snapshot was created may also be stored in conjunction with the snapshot.

Once the snapshot has been created, a user can access a listing of previously-stored snapshots for a domain name registered to the user. The user can then select one of the snapshots and cause the DNS settings for the domain name to be reverted back to the settings associated with the snapshot.

Figure 16:
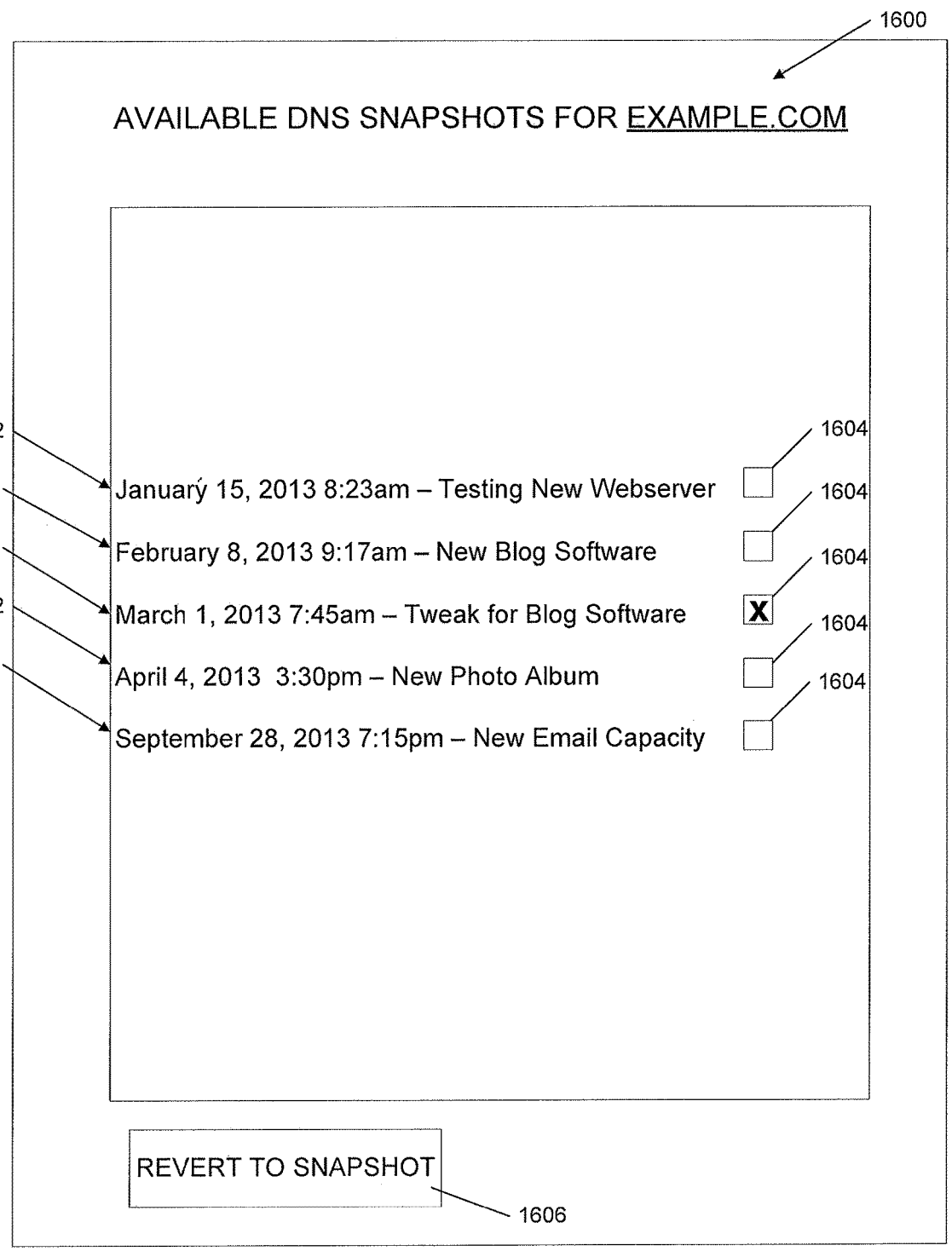
FIG. 16 is a screenshot depicting an example user interface enabling a user to select a snapshot containing DNS settings and apply those settings to a domain name.

To illustrate, FIG. 16 is a screenshot depicting an example user interface enabling a user to select a snapshot containing DNS settings and apply those settings to the domain name. In the example shown in FIG. 16, the user interface is displaying a listing of available snapshots for the domain name 'example.com'. In this example it is assumed that the user has sufficient permissions to modify the DNS records associated with the domain name 'example.com'. For example, user interface 1600 may be displayed on a domain name management website that requires a user to provide a username and password and be authenticated before being granted access to the DNS settings for a particular domain name.

As illustrated, interface 1600 identifies a number of snapshots 1602 that have been stored for the domain name. Displayed with each snapshot 1602 is the date and time at which the snapshot was created as well as any description that was provided by the user making the change that caused the snapshot to be created.

If the user wishes to revert the DNS settings for the domain name 'example.com' to an earlier set of settings, the user selects one of the snapshots 1602 using one of user interfaces 1604 (in this example checkboxes, though any suitable user interface may be utilized). After a snapshot 1602 is selected, the user clicks button 1606. After clicking button 1606 the system retrieves the contents of the selected snapshot 1602 and reverts the DNS settings associated with the domain name 'example.com' to those defined in the selected snapshot.

Although the descriptions supplied by the user can be useful in helping select the appropriate snapshot, in some embodiments the system may be configured to store additional information when a snapshot is created to further aid a user in selecting the correct desired snapshot when reverting the DNS settings for a domain name.

For example, FIG. 15B is a flowchart illustrating method 1550 for creating a snapshot in which additional diagnostic data is stored with the snapshot. The diagnostic data can be used to identify with more precision a prior snapshot (e.g., where the supplied description is not sufficiently precise). The diagnostic information may also be used to diagnose problems in the DNS settings.

In the present disclosure, method 1550 is described as an extension to method 1500 described above. Accordingly, method 1550 includes steps 1502, 1504, and 1506, described above with respect to method 1500.

After the snapshot has been created in step 1504, in step 1552 the requested changes are analyzed to identify each setting that is being changed. This may involve both new settings, as well as existing settings in which one or more value has been changed.

For each change, an IP address or hostname that makes up the value of the changed settings is identified. To illustrate, in the following record, the value is the hostname 'destination.com'.

| mikes-bikes.com. | IN | NS | destination.com. |
| --- | --- | --- | --- |

And in the following record, the value is the IP address 192.168.0.4.

| accounts | IN | A | 192.168.0.4 |
| --- | --- | --- | --- |

Having identified IP addresses and hostnames present for each change in the DNS settings, in step 1554 the status of each IP address and hostname is tested. This may involve, for example, pinging each IP addresses do determine whether the IP address points to a host or server that is responsive to the ping request. In other embodiments, any suitable technique (e.g., NSLOOK, HTTP/HTTPS tests, etc.) for determining whether an active host or server is present at the IP address may be utilized. The testing can determine whether the IP address or hostname points to a server accessible via the Internet. If no active host or server is identified, the user may be warned that the provided IP address or hostname does not point to a device accessible via the Internet.

After the IP addresses and domain names associated with each record change have been analyzed to determine whether they point to accessible hosts on the Internet, in step 1506 the snapshot is stored (this step may be substantially similar to the step 1506 in method 1500), and diagnostic data is also stored in 1556. The diagnostic data indicates, for each change, whether the change is associated with an IP address or domain name that is accessible via the Internet. This diagnostic information can be stored, for example, in database 107 in conjunction with the snapshot data stored in step 1506.

Having stored the diagnostic data in association with the snapshot, a user can access a listing of previously-stored snapshots for a domain name registered to the user and review both the description and diagnostic data associated with each snapshot. The user can then select one of the snapshots and cause the DNS settings for the domain name to be reverted back to the settings associated with the selected snapshot.

Figure 17:
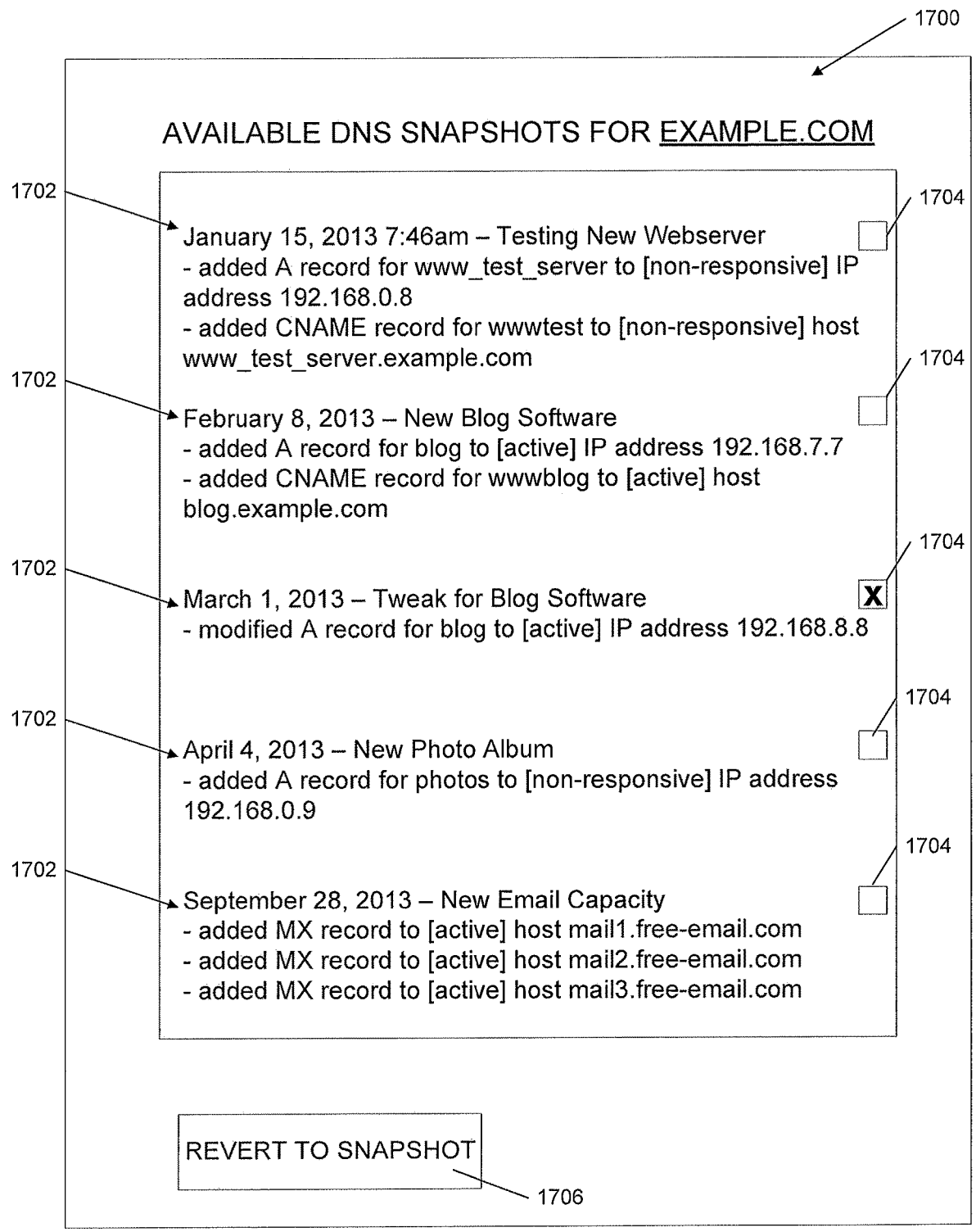
FIG. 17 is a screenshot depicting an example user interface enabling a user to select a snapshot containing DNS settings in which additional diagnostic data is displayed.

To illustrate, FIG. 17 is a screenshot depicting an example user interface enabling a user to select a snapshot containing DNS settings in which additional diagnostic data is displayed. In the example shown in FIG. 17, the user interface is displaying a listing of available snapshots for the domain name 'example.com'. In this example it is assumed that the user has sufficient permissions to modify the DNS records associated with the domain name 'example.com'. For example, user interface 1700 may be displayed on a domain name management website that requires a user to provide a username and password and be authenticated before being granted access to the DNS settings for a particular domain name.

As illustrated, interface 1700 identifies a number of snapshots 1702 that have been stored for the domain name. Displayed with each snapshot 1702 is the date and time at which the snapshot was created as well as any description that was provided by the user making the change that caused the snapshot to be created. Additionally, any diagnostic data associated with each snapshot is also presented. As described above, the diagnostic data provides an indication of whether the IP addresses and domain names associated with a record change pointed at the time of the change to accessible hosts on the Internet.

If the user wishes to revert the DNS settings for the domain name 'example.com' to an earlier set of settings, the user selects one of the snapshots 1702 using one of user interfaces 1704 (in this example checkboxes, though any suitable user interface may be utilized). After a snapshot 1702 is selected, the user clicks button 1706. After clicking button 1706 the system retrieves the contents of the selected snapshot 1702 and reverts the DNS settings associated with the domain name 'example.com' to those defined in the selected snapshot.

In one implementation a method includes receiving, by at least one server communicatively coupled to a network, a request from a user to create a custom domain name link to a third party service. The request identifies a custom domain name and the third party service. The method includes accessing, by the at least one server, a third party service link database to identify an entry for the third party service specifying either a uniform resource locator (URL) redirect-based custom domain name link or a domain name system (DNS)-based custom domain name link, and, when the entry specifies the URL redirect-based custom domain name link for the third party service, creating, without further input from the user, a first DNS entry pointing the custom domain name to a web server accessible to the at least one server, and creating, on the web server, a URL redirect to redirect Internet traffic directed to the custom domain name to the third party service. The method includes, when the entry specifies the DNS-based custom domain name link for the third party service, creating, without further input from the user, a second DNS entry pointing the custom domain name to the third party service, and causing the third party service to create a custom domain name mapping that maps the custom domain name to a user account of the user.

In another implementation, a method includes receiving, by at least one server communicatively coupled to a network, a request from a user to create a custom domain name link to a third party service. The request identifies a custom domain name and the third party service. The method includes retrieving, by the at least one server, from a third party service link database an entry for the third party service specifying how to create the custom domain name link for the third party service, and creating, by the at least one server, the custom domain name link in accordance with the entry retrieved from the third party service link database.

In another implementation, a system includes a third party service link database storing, for each of a plurality of third party services, at least one entry specifying either a uniform resource locator (URL) redirect-based custom domain name link or a domain name system (DNS)-based custom domain name link. The system includes a processor configured to perform the steps of receiving, by at least one server communicatively coupled to a network, a request from a user to create a custom domain name link to a third party service, the request identifying a custom domain name and the third party service, accessing, by the at least one server, the third party service link database to identify an entry for the third party service, when the entry specifies the URL redirect-based custom domain name link for the third party service, creating, without further input from the user, a first DNS entry pointing the custom domain name to a web server accessible to the at least one server, and creating, on the web server, a URL redirect to redirect Internet traffic directed to the custom domain name to the third party service, and, when the entry specifies the DNS-based custom domain name link for the third party service, creating, without further input from the user, a second DNS entry pointing the custom domain name to the third party service, and causing the third party service to create a custom domain name mapping that maps the custom domain name to a user account of the user.

In another embodiment a system includes a DNS template database configured to store DNS templates, a DNS record database configured to store a plurality of DNS records for a plurality of domain names, and a host computer server. The host computer server is configured to receive an electronic signal encoding a request to create a DNS template from a user. The request identifies a domain name. The host computer server is configured to access the DNS record database to retrieve a DNS record for the domain name identified in the request, parse the DNS record into a plurality of DNS settings, display the plurality of DNS settings on a user interface for the user, receive, via the user interface, a selection of at least one of the DNS settings by the user, construct a DNS template using the selection of the at least one of the DNS settings, and store the DNS template in the DNS template database.

In another embodiment, a system, includes a DNS template database configured to store DNS templates, a DNS record database configured to store a plurality of DNS records for a plurality of domain name, and a host computer server. The host computer server is configured receive an electronic signal encoding a request to apply a DNS template to a domain name from a user. The request identifies the domain name. The host computer server is configured to access the DNS template database to retrieve the DNS template identified in the request, and at least one of modify and create a record in the DNS record database to insert settings from the DNS template into a DNS record for the domain name.

In another embodiment, a method includes receiving an electronic signal encoding a request to create a DNS template from a user. The request identifies a domain name. The method includes accessing a DNS record database to retrieve a DNS record for the domain name identified in the request, parsing the DNS record into a plurality of DNS settings, displaying the plurality of DNS settings on a user interface for the user, receiving, via the user interface, a selection of at least one of the DNS settings by the user, constructing a DNS template using the selection of the at least one of the DNS settings, and storing the DNS template in a DNS template database.

In another embodiment, a system includes a DNS template database configured to store DNS templates, a DNS record database configured to store a plurality of DNS records for a plurality of domain names, and a host computer server. The host computer server is configured to receive an electronic signal encoding a request containing a modification to a DNS template from a user. The DNS template is stored in the DNS template database. The host computer server is configured to access the DNS template database to modify the DNS template according to request containing the modification to create a modified DNS template, identify a plurality of domain names using the DNS template, and, for each domain name in the plurality of domain names, access the DNS record database to at least one of modify and create a DNS record for the domain name using the modified DNS template.

In another embodiment, a system includes a DNS template database configured to store DNS templates, a DNS record database configured to store a plurality of DNS records for a plurality of domain names, and a host computer server. The host computer server is configured to receive an electronic signal encoding a request containing a modification to a DNS template from a user. The DNS template is stored in the DNS template database. The host computer server is configured to identify a domain name using the DNS template, and access the DNS record database to at least one of modify and create a DNS record for the domain name using the DNS template based upon the request.

In another embodiment, a method includes receiving an electronic signal encoding a request containing a modification to a DNS template from a user. The DNS template is stored in a DNS template database. The method includes accessing the DNS template database to modify the DNS template according to request containing the modification to create a modified DNS template, identifying a plurality of domain names using the DNS template, and, for each domain name in the plurality of domain names, accessing the DNS record database to at least one of modify and create a DNS record for the domain name using the modified DNS template.

In another embodiment, a system includes a DNS record database configured to store a plurality of DNS records for a plurality of domain name, and a host computer server. The host computer server is configured to detect a change in a DNS record for a domain name, upon detecting the change in the DNS record, encode, without any user input, at least one DNS setting from the DNS record for the domain name into a data storage file, prompt a user to provide a description, and store the data storage file containing the at least one DNS setting in a database in association with the description.

In another embodiment, a system includes a DNS record database configured to store a plurality of DNS records for a plurality of domain name, and a host computer server. The host computer server is configured to receive an electronic signal encoding a request to create a snapshot of a DNS record for a domain name, encode, in response to the request, at least one DNS setting from a DNS record associated with the domain name in the DNS record database into a data storage file, prompt a user to provide a description, and store the data storage file containing the at least one DNS setting in a database in association with the description.

In another embodiment, a method includes detecting a change in a DNS record for a domain name, upon detecting the change in the DNS record, encoding, without any user input, at least one DNS setting from the DNS record for the domain name into a data storage file, prompting a user to provide a description, and storing the data storage file containing the at least one DNS setting in a database in association with the description.

Various embodiments of the present invention may be embodied in many different forms, including, but in no way limited to, computer program logic for use with a processor (e.g., a microprocessor, micro controller, digital signal processor, server computer, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof.

Computer program logic implementing all or part of the functionality previously described herein may be embodied in various forms, including, but in no way limited to, a source code form, a computer executable form, and various intermediate forms (e.g., forms generated by an assembler, compiler, linker, or locator). Source code may include a series of computer program instructions implemented in any of various programming languages (e.g., an object code, an assembly language, or a high-level language such as C, C++, or JAVA) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) in a tangible storage medium, such as a semiconductor memory device (e.g., a RAM, ROM, PROM, EEPROM, or Flash-Programmable memory), a magnetic memory device (e.g., a diskette or fixed disk), an optical memory device (e.g., a CD-ROM), a PC card (e.g., PCMCIA card), or other memory device. The computer program may be distributed in any form as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

Programmable logic may be fixed either permanently or temporarily in a tangible storage medium, such as a semiconductor memory device (e.g., a RAM, ROM, PROM, EEPROM, or Flash-Programmable memory), a magnetic memory device (e.g., a diskette or fixed disk), an optical memory device (e.g., a CD-ROM), or other memory device. The programmable logic may be distributed as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

The present disclosure describes preferred embodiments with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the description, numerous specific details are recited to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included are generally set forth as logical flow-chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow-chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown. Some embodiments provided for are described as computer-implemented method claims. However, one of ordinary skill in the art would realize that the method steps may be embodied as computer code and the computer code could be placed on a tangible, non-transitory computer readable medium defining a computer program product.

Although the above discussion discloses various exemplary embodiments of the invention, it should be apparent that those skilled in the art can make various modifications that will achieve some of the advantages of the invention without departing from the true scope of the invention.

The invention claimed is:

1. A method, comprising:
receiving an electronic signal encoding a request containing a modification to a respective domain name system (DNS) template of a plurality of DNS templates from a user, the plurality of DNS templates being stored in a DNS template database;
wherein the respective DNS template comprises one or more variables establishing DNS settings;
accessing the DNS template database to modify the respective DNS template according to a request containing the modification to create a modified DNS template;
identifying a plurality of domain names having respective DNS records associated with the respective DNS template;
wherein each domain name of the plurality of domain names is configured according to the DNS settings established by the one or more variables of the respective DNS template; and
for a domain name in the plurality of domain names:
identifying a variable in the modified DNS template,
replacing the variable in the modified DNS template with the domain name to generate a domain name specific DNS template, and
accessing a DNS record database to at least one of modify and create a DNS record for the domain name using the domain name specific DNS template.

2. The method of claim 1, including, before accessing the DNS record database to at least one of modify and create the DNS record for the domain name, determine whether the user is authorized to modify the DNS template.

3. The method of claim 1, including, before accessing the DNS record database to at least one of modify and create a DNS record for the domain name, transmitting a confirmation request to a user associated with the domain name.

4. The method of claim 3, including only accessing the DNS record database to at least one of modify and create the DNS record for the domain name after receiving an indication of confirmation from the user.

5. The method of claim 1, including after receiving the request containing the modification, initiating a manual security review of the modification.

6. A system, comprising:
a domain name system (DNS) template database configured to store DNS templates;
wherein each DNS template comprises one or more variables establishing DNS settings in respective one or more DNS records of a plurality of DNS records;
a DNS record database configured to store the plurality of DNS records for a plurality of domain names; and
a host computer server, configured to:
receive an electronic signal encoding a request containing a modification to the one or more variables of a respective DNS template of the DNS templates stored in the DNS template database,
access the DNS template database to modify the respective DNS template according to the request containing the modification to create a modified DNS template,
identify a plurality of domain names having respective DNS records associated with the respective DNS template;
wherein each domain name of the plurality of domain names is configured according to the DNS settings of the respective DNS records established by the one or more variables of the respective DNS template, and
for each domain name in the plurality of domain names:
identify a domain name variable of the one or more variables in the modified DNS template,
replace the domain name variable in the modified DNS template with the domain name to generate a domain name specific DNS template, and
access the DNS record database to at least one of modify and create a DNS record for the domain name using the domain name specific DNS template.

7. The system of claim 6, wherein the host computer server is configured to, before accessing the DNS record database to at least one of modify and create the DNS record for the domain name, determine whether the user is authorized to modify the DNS template.

8. The system of claim 6, wherein the host computer server is configured to, before accessing the DNS record database to at least one of modify and create a DNS record for the domain name, transmit a confirmation request to a user associated with the domain name.

9. The system of claim 8, wherein the host computer server is configured to only access the DNS record database to at least one of modify and create the DNS record for the domain name after receiving an indication of confirmation from the user.

10. The system of claim 6, where the host computer server is configured to receive, from the user, a description of the modification to the DNS template.

11. The system of claim 6, wherein the host computer server is configured to, after receiving the request containing the modification, initiate a manual security review of the modification.

12. A system, comprising:
a domain name system (DNS) template database configured to store DNS templates;
wherein each DNS template comprises one or more variables establishing DNS settings;
a DNS record database configured to store a plurality of DNS records for a plurality of domain names; and
a host computer server, configured to:
receive an electronic signal encoding a request containing a modification to a DNS template from a user, the DNS template being stored in the DNS template database,
identify a domain name of a plurality of domain names having a DNS record associated with the DNS template;
wherein the plurality of domain names are configured according to the DNS settings established by the one or more variables of the DNS template,
identify a variable in the DNS template,
replace the variable with the domain name to generate a modified DNS template, and access the DNS record database to at least one of modify and create a DNS record for the domain name using the modified DNS template.

13. The system of claim 12, wherein the host computer server is configured to, before accessing the DNS record database to at least one of modify and create the DNS record for the domain name using the DNS template, determine whether the user is authorized to modify the DNS template.

14. The system of claim 12, wherein the host computer server is configured to modify the DNS template in the DNS template database according to the request to create a modified DNS template.

15. The system of claim 14, wherein accessing the DNS record database to at least one of modify and create a DNS record for each domain name using the DNS template based upon the request includes retrieving the modified DNS template from the DNS template database.

16. The system of claim 12, wherein the host computer server is configured to, before accessing the DNS record database to at least one of modify and create a DNS record for the domain name, transmit a confirmation request to a user associated with the domain name.

17. The system of claim 16, wherein the host computer server is configured to only access the DNS record database to at least one of modify and create a DNS record for the domain name using the DNS template based upon the request after receiving an indication of confirmation from the user.

* * * * *